(12) United States Patent
Firnkorn et al.

(10) Patent No.: US 11,757,884 B2
(45) Date of Patent: Sep. 12, 2023

(54) METHOD AND SYSTEM FOR CONTROLLING THE RELEASE OF A RESOURCE

(71) Applicant: Siemens Aktiengesellschaft, Munich (DE)

(72) Inventors: Lutz Firnkorn, Osnabrück (DE); Joachim Sokol, Unterhaching (DE); Martin Weber, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 152 days.

(21) Appl. No.: 17/056,504

(22) PCT Filed: May 28, 2019

(86) PCT No.: PCT/EP2019/063747
§ 371 (c)(1),
(2) Date: Nov. 18, 2020

(87) PCT Pub. No.: WO2019/229031
PCT Pub. Date: Dec. 5, 2019

(65) Prior Publication Data
US 2021/0218745 A1     Jul. 15, 2021

(30) Foreign Application Priority Data

May 29, 2018   (EP) .................................... 18174946
Jun. 29, 2018   (EP) .................................... 18180845

(51) Int. Cl.
*H04L 29/06*     (2006.01)
*H04L 9/40*      (2022.01)

(52) U.S. Cl.
CPC ............ *H04L 63/10* (2013.01); *H04L 63/123* (2013.01)

(58) Field of Classification Search
CPC ....... H04L 63/10; H04L 63/123; H04L 63/20; H04L 63/0807; H04L 63/0876; H04L 63/0823
(Continued)

(56) References Cited

U.S. PATENT DOCUMENTS 8,639,758 B2 * 1/2014 Ristock ................. G06Q 30/06
                                                 709/205
10,938,548 B2 * 3/2021 Mercuri .............. G06Q 20/389
(Continued)

FOREIGN PATENT DOCUMENTS

CN      106716421 A      5/2017
CN      107341702 A      11/2017
(Continued)

OTHER PUBLICATIONS

Needham Roger M et al: "Using encryption for authentication in large networks of computers", ACM: Communications of the ACM, vol. 21, No. 12, Dec. 1978; 1978.
Baird Leemon: "The Swirlds Hashgraph Consensus Algorithm: Fair, Fast, Byzantine Fault Tolerance", Swirlds Tech Report SWIRLDS-TR-2016-01; 2016.
Baird Leemon: "Overview of Swirlds Hashgraph", Swirlds; 2016.
The Ethereum Book Project/Mastering Ethereum https://github.com/ethereumbook/ethereumbook, Status: Oct. 24, 2017; 2017.
(Continued)

*Primary Examiner* — Longbit Chai
(74) *Attorney, Agent, or Firm* — Schmeiser, Olsen & Watts LLP

(57) ABSTRACT

A resource control system for networked devices in which the subscribers of the networked devices do not trust one another is provided. Also provided is a distributed data bank system, which, for example, is implemented by a blockchain.

20 Claims, 4 Drawing Sheets

(58) Field of Classification Search
USPC .......................................................... 726/27
See application file for complete search history.

(56) References Cited

U.S. PATENT DOCUMENTS

| | | | |
|---|---|---|---|
| 2012/0117157 | A1 | 5/2012 | Ristock |
| 2017/0005804 | A1 | 1/2017 | Zinder |
| 2017/0085545 | A1 | 3/2017 | Lohe et al. |
| 2017/0232300 | A1* | 8/2017 | Tran ................... H04L 67/535 |
| | | | 434/247 |
| 2018/0260909 | A1 | 9/2018 | Li |
| 2018/0285810 | A1* | 10/2018 | Ramachandran ....... G06F 16/27 |
| 2019/0173884 | A1 | 6/2019 | Vincent |

FOREIGN PATENT DOCUMENTS

| | | |
|---|---|---|
| CN | 107480555 A | 12/2017 |
| CN | 107924389 A | 4/2018 |
| CN | 107995197 A | 5/2018 |
| CN | 109791671 A | 5/2019 |
| WO | WO 2018019364 A1 | 2/2018 |
| WO | 2018120129 A1 | 7/2018 |

OTHER PUBLICATIONS

Anderson Ross: "Security Engineering. A Guide to Building Dependable Distributed Systems"; Wiley; Jan. 2001; 2001.

Diedrich, Henning "Ethereum: Blockchains, Digital Assets, Smart Contracts, Decentralized Autonomous Organizations" CreateSpace Independent Publishing Platform, Sep. 8, 2016 // ISBN-10:1523930470 // ISBN-13: 978-1523930470.

Blockchainhub: "Blockchain Oracles", https://blockchainhub.net/blockchain-oracles/; 2018.

Antonopoulos Andraes M: "Mastering Bitcoin—Unlocking Digital Cryptocurrencies", O'Reilly Media, Beijing Cambridge Farnham Köln; Sebastopol Tokyo, XP055306939, ISBN: 978-1-4493-7404-4, pp. 113, 123, 158, 179-182, 18-25, 61-63, 161-173; the whole document; 201.

PCT International Search Report of International Searching Authority dated Jul. 9, 2019 corresponding to PCT International Application No. PCT/EP2019/063747 filed May 28, 2019.

Kremp, Matthias et al "HP Instant Ink im Test—Der Spiegel". Aug. 31, 2015 (Aug. 31, 2015) XP055975125 Gefunden im Internet: https://www.spiegel.de/netzwelt/gadgets/hp-instant-ink-imtest-a-1050296.html gefunden am Oct. 26, 2022 2015.

* cited by examiner

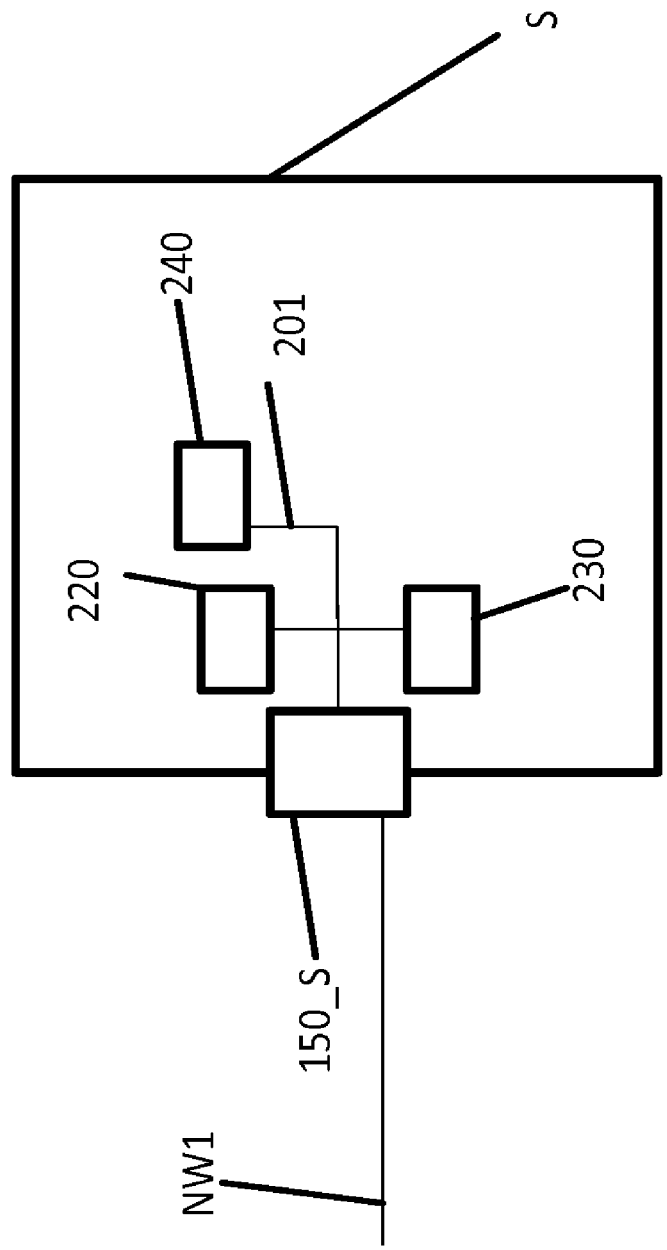

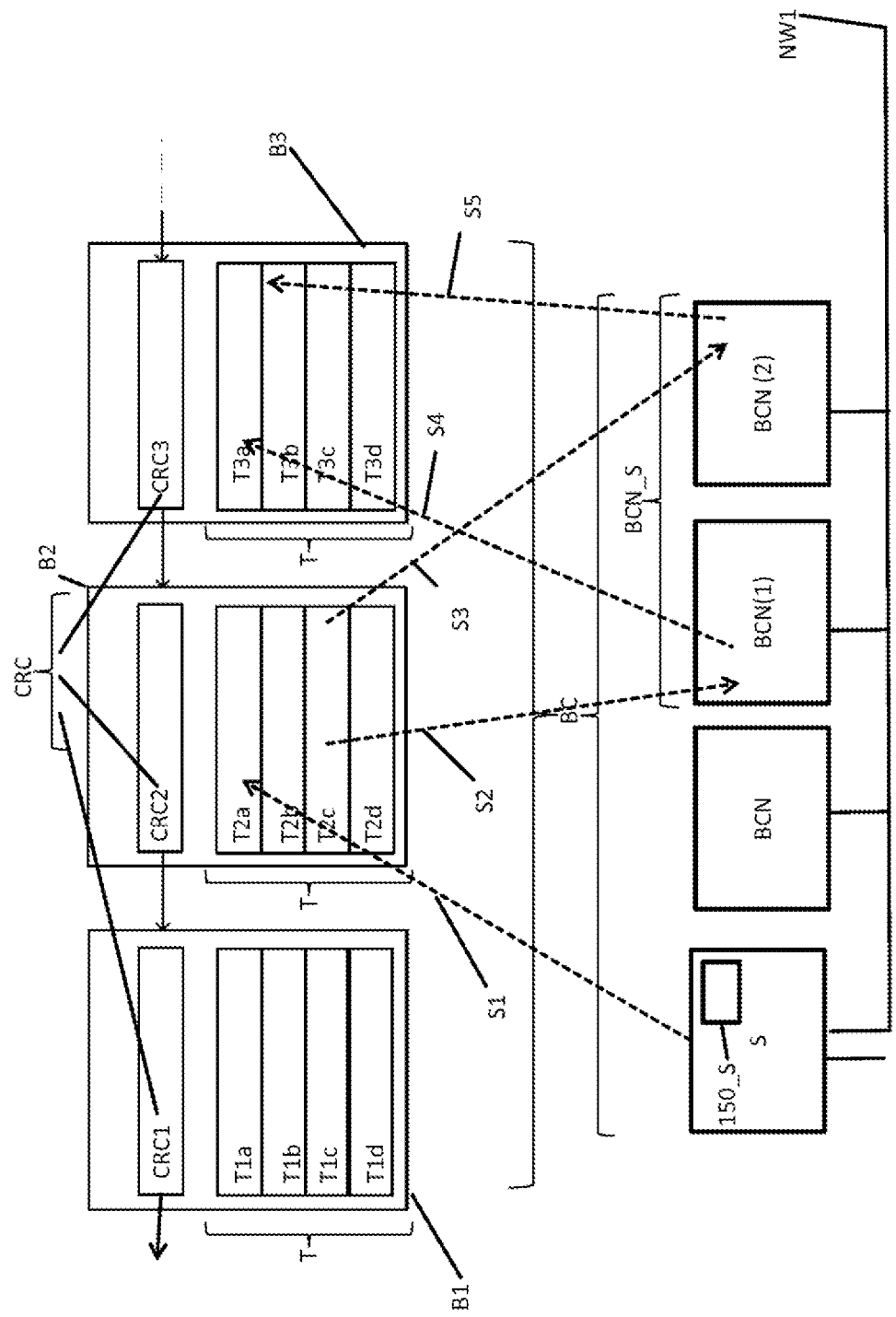

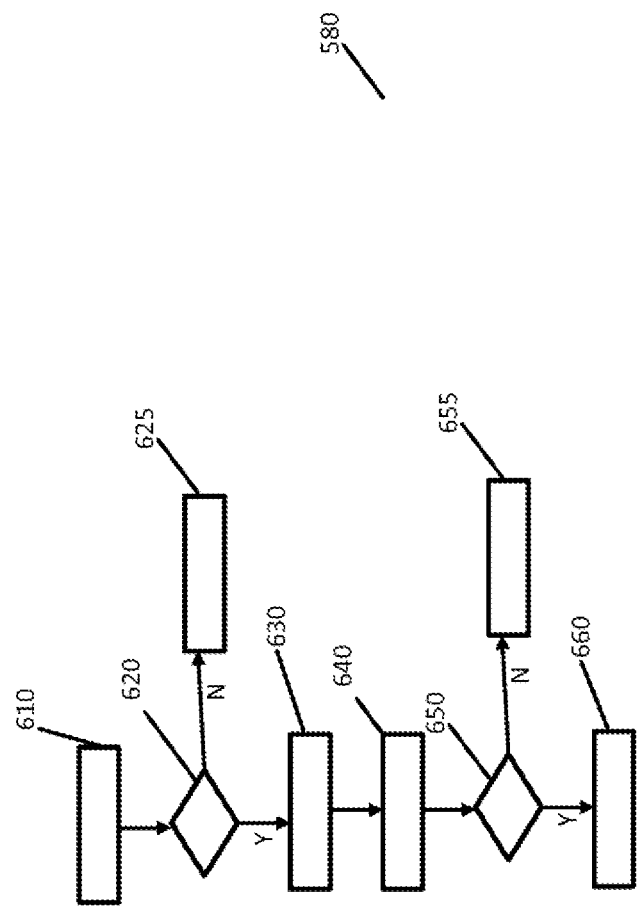
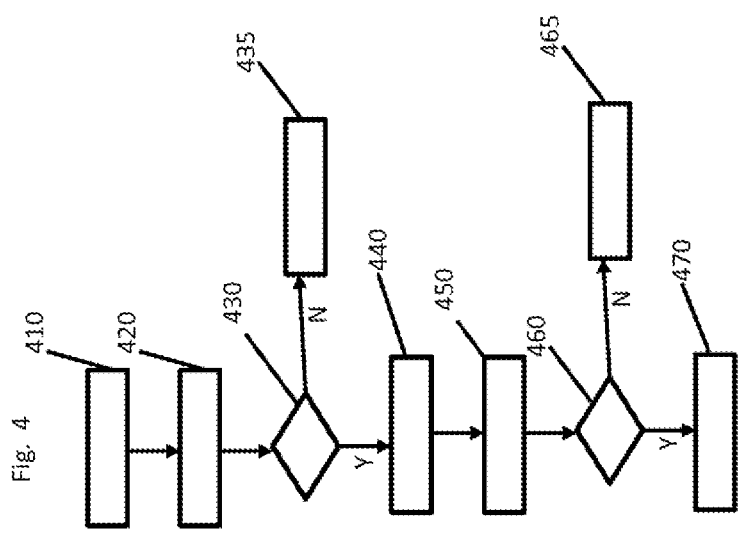
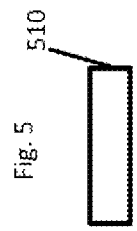

METHOD AND SYSTEM FOR CONTROLLING THE RELEASE OF A RESOURCE

CROSS-REFERENCE TO RELATED APPLICATIONS

This application claims priority to PCT Application No. PCT/EP2019/063747, having a filing date of May 28, 2019, which is based on EP Application No. 18180845.2, having a filing date of Jun. 29, 2018 and EP Application No. 18174946.6, having a filing date of May 29, 2018, the entire contents all of which are hereby incorporated by reference.

FIELD OF TECHNOLOGY

The following relates to a method and a system for controlling the release of a resource.

BACKGROUND

Devices such as field devices and manufacturing devices are becoming networked to a greater and greater extent and can be provided/operated by different operators, for example. Sequences of commands are often communicated to these devices, and they can be executed by the devices. What is disadvantageous here is that it is difficult to control the processing of the sequences of commands in a heterogenous network of devices on the part of different operators. The release of resources assigned to an object can be controlled only with difficulty in complexly distributed systems.

SUMMARY

The technology of blockchains or "distributed ledgers" is currently a technology that is being intensively discussed and that can be realized as a distributed database system. Besides applications for decentralized payment systems (e.g. bitcoin), new application possibilities are being developed in the financial industry. Transactions between companies can be realized by this means without mediators or a clearing house, in a manner protected against manipulation. This enables new business models without a trustworthy mediator, it reduces the transaction costs, and new digital services can be offered in a flexible manner, without the need to set up trust relationships and an infrastructure set up specifically for this. A transaction data set (or transaction for short) protected by a blockchain comprises program code, for example, which can also be referred to as a so-called "smart contract".

In accordance with a first aspect, embodiments of the invention relate to a control system for controlling a resource release module for providing resources comprising:
- a transmitter for transmitting a providing inquiry data set by a first communication module, wherein
  - the providing inquiry data set comprises a providing request for a resource assigned to an object,
  - the providing inquiry data set comprises transmitter information of the transmitter of the providing inquiry data set,
  - the providing inquiry data set comprises an object-specific object data set for the object;
- a distributed database system having
  - a multiplicity of nodes, wherein the nodes are connected to one another via a first communication network;
  - a second communication module for receiving the providing inquiry data set;
  - a first checking module for checking the transmitter on the basis of the transmitter information, wherein the first checking module provides a corresponding transmitter checking result;
  - a first storage module for storing the providing inquiry data set with the corresponding transmitter checking result in an inquiry transaction, wherein
    - the inquiry transaction is stored by the distributed database system,
    - the inquiry transaction communicates to a predefined number of receivers by the distributed database system,
    - the predefined number of receivers is ascertained on the basis of the transmitter checking result and/or the transmitter information and/or the object-specific object data set;
  - a predefined number of inquiry processing nodes, wherein
    - the predefined number of inquiry processing nodes is the predefined number of receivers,
    - the inquiry processing nodes in each case ascertain an object-specific authorization release on the basis of the providing request, the object-specific object data set and the transmitter information,
    - for example the respective object-specific authorization releases are stored in transactions of the distributed database system;
  - an authorization control module for ascertaining a total authorization release of the resource assigned to the object, wherein
    - the respective object-specific authorization releases of the respective inquiry processing nodes are taken into account for ascertaining the total authorization release;
    - for example the total authorization release is stored in transactions of the distributed database system;
  - a resource release module, wherein
    - providing the resource assigned to the object is controlled by the total authorization release.

Unless indicated otherwise in the following description, the terms "carry out", "calculate", "computer-aided", "compute", "ascertain", "generate", "configure", "reconstruct" and the like relate to actions and/or processes and/or processing steps which change and/or generate data and/or convert data into other data, wherein the data can be represented or be present as physical variables, for example as electrical pulses. The expression "computer" should be interpreted as broadly as possible to cover all electronic devices having data processing properties. Computers can thus be for example personal computers, servers, programmable logic controllers (PLCs), handheld computer systems, pocket PC devices, mobile radio devices and other communication devices which can process data in a computer-aided manner, processors and other electronic devices for data processing.

In association with embodiments of the invention, "computer-aided" can be understood to mean for example an implementation of the method in which a processor performs at least one method step of the method.

In association with embodiments of the invention, a processor can be understood to mean for example a machine or an electronic circuit. A processor can be a central processing unit (CPU), a microprocessor or a microcontroller, for example an application-specific integrated circuit or a digital signal processor, possibly in combination with a storage unit for storing program instructions, etc. A processor can for example also be an IC (Integrated Circuit), an FPGA (Field Programmable Gate Array) or an ASIC (Application-Specific Integrated Circuit), or a DSP (Digital Signal Processor) or a graphic processing unit (GPU). Moreover, a processor can be understood to mean a virtualized processor, a virtual machine or a soft CPU. It can for example also be a programmable processor which is equipped with configuration steps for performing the stated method according to embodiments of the invention or is configured with configuration steps in such a way that the programmable processor implements the features according to embodiments of the invention of the method, of the component, of the modules, or of other aspects and/or partial aspects of embodiments of the invention.

In association with embodiments of the invention, a "storage unit" or "storage module" and the like can be understood to mean for example a volatile memory in the form of main memory (Random-Access Memory, RAM) or a permanent memory such as a hard disk or a data carrier.

In association with embodiments of the invention, a "module" can be understood to mean for example a processor and/or a storage unit for storing program instructions. By way of example, the processor is specifically designed to execute the program instructions in such a way that the processor executes functions for implementing or realizing the method according to embodiments of the invention or a step of the method according to embodiments of the invention. A module can for example also be a node of the distributed database system that realizes for example the specific functions/features of a corresponding module. The respective modules can for example also be embodied as separate or independent modules. For this purpose, the corresponding modules can comprise further elements, for example. These elements are for example one or more interfaces (e.g. database interfaces, communication interfaces—e.g. network interface, WLAN interface) and/or an evaluation unit (e.g. a processor) and/or a storage unit. The interfaces, for example, data can be exchanged (e.g. received, communicated, transmitted or provided). The evaluation unit, data can be compared, checked, processed, assigned or calculated for example in a computer-aided manner and/or in an automated manner. The storage unit, data can be stored, retrieved or provided for example in a computer-aided manner and/or in an automated manner.

In association with embodiments of the invention, "comprise", with regard to data and/or information, can be understood to mean for example (computer-aided) storage of corresponding information and/or of a corresponding datum in a data structure/data set (which e.g. is in turn stored in a storage unit).

In association with embodiments of the invention, "assign", with regard to data and/or information, can be understood to mean for example a computer-aided assignment of data and/or information. By way of example, a first datum, for this purpose, by a storage address or a unique identifier (UID), is assigned a second datum e.g. by the first datum being stored together with the storage address or the unique identifier of the second datum together in a data set.

In association with embodiments of the invention, "provide", with regard to data and/or information, can be understood to mean for example computer-aided providing. The providing is effected for example via an interface (e.g. a database interface, a network interface, an interface to a storage unit). Via the interface, for example, during providing, corresponding data and/or information can be communicated and/or transmitted and/or retrieved and/or received.

In association with embodiments of the invention, "provide" can also be understood to mean for example loading or storing, for example a transaction with corresponding data. This can be done for example on or by a storage module. "Providing" can for example also be understood to mean transferring (or transmitting or communicating) corresponding data from one node to another node of the blockchain or of the distributed database system (or the infrastructure thereof).

In association with embodiments of the invention, "smart contract process" can be understood to mean execution of a program code (e.g. of the control commands) in a process by the distributed database system or the infrastructure thereof.

In association with embodiments of the invention, a "checksum", for example a data block checksum, a data checksum, a node checksum, a transaction checksum, a linking checksum or the like, can be understood to mean for example a cryptographic checksum or cryptographic hash or hash value that is formed or calculated by a cryptographic hash function by way of a data set and/or data and/or one or more of the transactions and/or a partial area of a data block (e.g. the block header of a block of a blockchain or data block header of a data block of the distributed database system or only a portion of the transactions of a data block). A checksum can be checksum(s) or hash value(s) of a hash tree (e.g. Merkle tree, Patricia tree). Furthermore, it can also be understood to mean a digital signature or a cryptographic message authentication code. The checksums, at different levels of the database system, for example, it is possible to realize cryptographic protection/protection against manipulation for the transactions and the data (sets) stored therein. If high security is required, for example, the checksums are generated and checked at the transaction level, for example. If the security required is not as high, the checksums are generated and checked for example at the block level (e.g. over the entire data block or only over a portion of the data block and/or a portion of the transactions).

In association with embodiments of the invention, a "data block checksum" can be understood to mean a checksum that is calculated for example over a portion or all transactions of a data block. A node can then check/establish the integrity/authenticity of the corresponding portion of a data block by the data block checksum, for example. Additionally or alternatively, the data block checksum may also have been formed over transactions of a preceding data block/predecessor data block of the data block. In this case, the data block checksum can also be realized by a hash tree, for example a Merkle tree [1] or a Patricia tree, wherein the data block checksum is the root checksum of the Merkle tree or of a Patricia tree or of a binary hash tree. Transactions are safeguarded by further checksums from the Merkle tree or Patricia tree (e.g. using the transaction checksums), wherein in particular the further checksums are leaves in the Merkle tree or Patricia tree. The data block checksum can thus safeguard the transactions for example by the root checksum being formed from the further checksums. The data block checksum can be calculated for transactions of a specific data block of the data blocks. Such a data block checksum can influence a data block succeeding the specific data block in order to link this succeeding data block for example with its preceding data blocks and thus to make an integrity of the distributed database system checkable. By this means, the data block checksum can for example perform the function of the linking checksum or influence the linking checksum. The header of a data block (e.g. of a new data block or of the data block for which the data block checksum was formed) can comprise the data block checksum, for example.

In association with embodiments of the invention, "transaction checksum" can be understood to mean a checksum which is formed over a transaction of a data block. In addition, for example a calculation of a data block checksum for a corresponding data block can be accelerated since, for this purpose, for example already calculated transaction checksums can be used straightaway as leaves of a Merkle tree, for example.

In association with embodiments of the invention, a "linking checksum" can be understood to mean a checksum which indicates or references a respective data block of the distributed database system the preceding data block of the distributed database system (often referred to as "previous block hash", in the technical literature) [1]. For this purpose, a corresponding linking checksum is formed for the corresponding preceding data block. As linking checksum, for example, a transaction checksum or the data block checksum of a data block (that is to say a present data block of the distributed database system) can be used to link a new data block with a (present) data block of the distributed database system. However, it is also possible, of course, for a checksum to be formed over a header of the preceding data block or over the entire preceding data block and to be used as linking checksum. This can for example also be calculated for a plurality or all of the preceding data blocks. It is also possible to realize a procedure for example in which the linking checksum is formed over the header of a data block and the data block checksum. However, a respective data block of the distributed database system comprises in each case a linking checksum which was calculated, or refers to, a data block preceding the respective data block, even more the data block directly preceding the respective data block. It is also possible, for example, for a corresponding linking checksum also to be formed only over a portion of the corresponding data block (e.g. preceding data block). As a result, a data block comprising an integrity-protected portion and an unprotected portion can be realized, for example. A data block whose integrity-protected portion is invariable and whose unprotected portion can also still be changed later could thus be realized, for example. In this case, integrity-protected should be understood to mean that an alteration of integrity-protected data is able to be established by a checksum.

The data which are stored in a transaction of a data block, for example, can be provided in various ways. Instead of the data, e.g. user data such as measurement data or data/ownership concerning assets, for example a transaction of a data block can comprise only the checksum for these data. In this case, the corresponding checksum can be realized in various ways. This can be e.g. a corresponding data block checksum of a data block (with the corresponding data) of a different database or of the distributed database system, a transaction checksum of a data block with the corresponding data (of the distributed database system or of a different database) or a data checksum that was formed over the data.

In addition, the corresponding transaction can also comprise a reference or an indication concerning a storage location (e.g. an address of a file server and indications of where the corresponding data may be found on the file server; or an address of a different distributed database comprising the data). The corresponding data could then for example also be provided in a further transaction of a further data block of the distributed database system (e.g. if the corresponding data and the associated checksums are comprised in different data blocks). However, it is also conceivable, for example, for these data to be provided via a different communication channel (e.g. via a different database and/or a cryptographically secure communication channel).

Moreover, in addition to the checksum, for example, it is possible to store an additional data set (e.g. a reference or an indication concerning a storage location) in the corresponding transactions, which indicates a storage location where the data can be retrieved. That is advantageous so as to minimize a data size of the blockchain or of the distributed database system.

In association with embodiments of the invention, "security-protected" can be understood to mean for example protection that is realized by a cryptographic method. By way of example, this can be realized by use of the distributed database system for providing or transferring or transmitting corresponding data/transactions. This is achieved by a combination of the different (cryptographic) checksums by virtue of the latter interacting synergistically, in order to improve for example the security or the cryptographic security for the data of the transactions. In other words, in association with embodiments of the invention, "security-protected" can also be understood to mean "cryptographically protected" and/or "manipulation-protected", wherein "manipulation-protected" can also be referred to as "integrity-protected".

In association with embodiments of the invention, "linking (the) data blocks of a distributed database system" can be understood to mean for example that data blocks each comprise information (e.g. linking checksum) that refers to or references one other data block or a plurality of other data blocks of the distributed database system [1] [4] [5].

In association with embodiments of the invention, "inserting into the distributed database system" and the like can be understood to mean for example that a transaction or the transactions or a data block with its transactions is/are communicated to one or more nodes of a distributed database system. If these transactions are validated successfully (e.g. by the node(s)), for example, these transactions are linked as a new data block with at least one present data block of the distributed database system [1] [4] [5]. For this purpose, the corresponding track sections are stored in a new data block, for example. This validating and/or linking can be effected by a trustworthy node (e.g. a mining node, a blockchain oracle or a blockchain platform). A blockchain platform can be understood here to mean a blockchain as service, as proposed by Microsoft or IBM. A trustworthy node and/or a node can in each case store a node checksum (e.g. a digital signature) in a data block (e.g. in the data block generated and validated by them, which is then linked) in order to enable an identifiability of the creator of the data block and/or to enable an identifiability of the node. In this case, the node checksum indicates which node has linked for example the corresponding data block with at least one other data block of the distributed database system.

In association with embodiments of the invention, "transaction" or "transactions" can be understood to mean for example a smart contract [4] [5], a data structure or a transaction data set that comprises in each case one of the transactions or a plurality of transactions. In association with embodiments of the invention, "transaction" or "transactions" can for example also be understood to mean the data of a transaction of a data block of a blockchain. A transaction can comprise a program code that realizes a smart contract, for example. By way of example, in association with embodiments of the invention, transaction can also be understood to mean a control transaction and/or confirmation transaction. Alternatively, a transaction can be for example a data structure that stores data (e.g. the control commands and/or contract data and/or other data such as video data, user data, measurement data, etc.).

In association with embodiments of the invention, "object" can be understood to mean for example devices, electronic devices, electronic components, electronic communication devices (e.g. a cellular phone), technical installations, buildings or technical systems, each of which comprises at least one electronic component whose state is detectable by a sensor. In this case, a state change of the state of the object or of the electronic component of the object is likewise detectable by the sensor. The state change or the state can also relate to non-electronic components of the object. This may be for example a change in statics of a building or a deformation of a metal part (e.g. a frame). The state or the state change is detected in a computer-aided manner and/or in an automated manner and/or provided to the control system or the distributed database system by an interface.

"Storing transactions in data blocks", "storing transactions" and the like should be understood to mean direct storing or indirect storing. In this case, direct storing can be understood to mean for example that the corresponding data block (of the distributed database system) or the corresponding transaction (of the distributed database system) comprises the respective data. In this case, indirect storing can be understood to mean for example that the corresponding data block or the corresponding transaction comprises a checksum and optionally an additional data set (e.g. a reference or an indication concerning a storage location) for corresponding data and, consequently, the corresponding data are not stored directly in the data block (or the transaction) (i.e. instead only a checksum for these data). When storing transactions in data blocks, it is possible to validate these checksums, for example, as explained for example under "inserting into the distributed database system".

In association with embodiments of the invention, a "program code" (e.g. a smart contract) can be understood to mean for example one program instruction or a plurality of program instructions, which are stored in one or a plurality of transactions. The program code is executable, and is executed by the distributed database system, for example. This can be realized by an execution environment (e.g. of a virtual machine), for example, wherein the execution environment and respectively the program code are Turing complete. The program code is executed by the infrastructure of the distributed database system [4] [5]. In this case, for example, a virtual machine is realized by the infrastructure of the distributed database system.

In association with embodiments of the invention, a "smart contract" can be understood to mean for example an executable program code [4] [5] (see, the definition of "program code"). The smart contract is stored in a transaction of a distributed database system (e.g. a blockchain), for example in a data block of the distributed database system. By way of example, the smart contract can be executed in the same way as explained in the definition of "program code", in association with the invention.

In association with embodiments of the invention, "proof-of-work verification" can be understood to mean for example solving a computationally intensive task which is to be solved depending on the data block content/content of a specific transaction [1] [4] [5]. Such a computationally intensive task is for example also referred to as a cryptographic puzzle.

In association with embodiments of the invention, a "distributed database system", which can for example also be referred to as a distributed database, can be understood to mean for example a decentralized distributed database, a blockchain, a distributed ledger, a distributed storage system, a distributed ledger technology (DLT) based system (DLTS), an audit-proof database system, a cloud, a cloud service, a blockchain in a cloud or a peer-to-peer database. Moreover, it is possible to use, for example various implementations of a blockchain or a DLTS, such as e.g. a blockchain or a DLTS implemented by a directed acyclic graph (DAG), a cryptographic puzzle, a Hashgraph or a combination of the implementation variants mentioned [6] [7]. Moreover, various consensus methods (referred to as consensus algorithms) can be implemented. This can be for example a consensus method by a cryptographic puzzle, gossip about gossip, virtual voting or a combination of the methods mentioned (e.g. gossip about gossip combined with virtual voting) [6] [7]. If a blockchain is used, for example, then this can be implemented by a bitcoin-based realization or an Ethereum-based realization [1] [4] [5]. A "distributed database system" can for example also be understood to mean a distributed database system of which at least some of its nodes and/or devices and/or infrastructure are realized by a cloud. By way of example, the corresponding components can be realized as nodes/devices in the cloud (e.g. as a virtual node in a virtual machine). This can be effected for example by VM-Ware, Amazon Web Services or Microsoft Azure. On account of the high flexibility of the implementation variants explained, partial aspects of the implementation variants mentioned can also be combined with one another, e.g. by using a Hashgraph as a blockchain, wherein the blockchain itself can e.g. also be blockless.

If for example a directed acyclic graph (DAG) is used (e.g. IOTA or Tangle), transactions or blocks or nodes of the graph are connected to one another via directed edges. This means, that (all) edges (always) have the same direction, in a similar manner to time, for example. In other words, it is not possible, to move or jump to the transactions or the blocks or the nodes of the graph backwards (that is to say in the opposite direction to the same direction shared). Acyclic here means, that there are no loops when moving through the graph.

The distributed database system can be for example a public distributed database system (e.g. a public blockchain) or a closed (or private) distributed database system (e.g. a private blockchain).

If a public distributed database system is involved, for example, this means that new nodes and/or devices can join the distributed database system or be accepted by the latter without authorization verifications or without authentication or without log-on information or without credentials. The operators of the nodes and/or devices can remain anonymous in such a case.

If the distributed database system is a closed distributed database system, for example, new nodes and/or devices require for example a valid authorization verification and/or valid authentication information and/or valid credentials and/or valid log-on information in order to be able to join the distributed database system or in order to be accepted by the latter.

A distributed database system can also be for example a distributed communication system for data exchange. This can be for example a network or a peer-to-peer network.

In association with embodiments of the invention, "data block", which can also be referred to as "link" or "block" in particular depending on context and realization, can be understood to mean for example a data block of a distributed database system (e.g. a blockchain or a peer-to-peer database), which is realized as a data structure and comprises in each case one of the transactions or a plurality of the transactions. In one implementation, for example, the database (or the database system) can be a DLT based system (DLTS) or a blockchain and a data block can be a block of the blockchain or of the DLTS. A data block can comprise for example indications concerning the size (data size in bytes) of the data block, a data block header, a transaction counter and one or more transactions [1]. The data block header can comprise for example a version, a linking checksum, a data block checksum, a time stamp, a proof-of-work verification and a nonce (one-off value, random value or counter used for the proof-of-work verification) [1] [4] [5]. A data block can for example also be only a specific storage area or address area of the entire data stored in the distributed database system. It is thus possible to realize for example blockless distributed database systems, such as e.g. the IOT chain (ITC), IOTA, and Byteball. In this case, the functionalities of the blocks of a blockchain and of the transactions are combined with one another in such a way that e.g. the transactions themselves safeguard the sequence or chain of transactions (of the distributed database system) (that is to say, are stored in a security-protected manner). For this purpose, with a linking checksum, for example, the transactions themselves can be linked with one another, by a separate checksum or the transaction checksum of one or more transactions serving as linking checksum, which is concomittantly stored in the corresponding new transaction when a new transaction is stored in the distributed database system. In such an embodiment, a data block can for example also comprise one or more transactions, wherein in the simplest case for example a data block corresponds to a transaction.

In association with embodiments of the invention, "nonce" can be understood to mean for example a cryptographic nonce (abbreviation of: "used only once" [2] or "number used once" [3]). A nonce denotes an individual combination of numbers or letters that is used once in the respective context (e.g. transaction, data transfer).

In association with embodiments of the invention, "data blocks preceding a (specific) data block of the distributed database system" can be understood to mean for example that data block of the distributed database system which directly precedes a (specific) data block. Alternatively, "data blocks preceding a (specific) data block of the distributed database system" can also be understood to mean all data blocks of the distributed database system which precede the specific data block. As a result, by way of example, the linking checksum or the transaction checksum can be formed only over the data block (or the transactions thereof) directly preceding the specific data block or over all data blocks (or the transactions thereof) preceding the first data block.

In association with embodiments of the invention, a "blockchain node", "node", "node of a distributed database system" and the like can be understood to mean for example devices (e.g. field devices, cellular phones), computers, smartphones, clients or subscribers that carry out operations with the distributed database system (e.g. a blockchain) [1] [4] [5]. Such nodes can for example execute transactions of a distributed database system or the data blocks thereof or introduce or link new data blocks with new transactions into the distributed database system by new data blocks. This validating and/or linking can be effected by a trustworthy node (e.g. a mining node) or exclusively by trustworthy nodes. A trustworthy node is for example a node that has additional security measures (e.g. firewalls, access restrictions to the node or the like) in order to prevent a manipulation of the node. Alternatively or additionally, by way of example, during the linking of a new data block with the distributed database system, a trustworthy node can store a node checksum (e.g. a digital signature or a certificate) in the new data block. A verification can thus be provided, which indicates that the corresponding data block was inserted by a specific node or indicates its origin. The devices (e.g. the corresponding device) are for example devices of a technical system and/or an industrial installation and/or an automation network and/or a manufacturing installation which are also a node of the distributed database system. In this case, the devices can be for example field devices or devices in the Internet of Things which are also a node of the distributed database system. Nodes can for example also comprise at least one processor in order to carry out e.g. their computer-implemented functionality.

In association with embodiments of the invention, a "blockchain oracle" and the like can be understood to mean for example nodes, devices or computers that have e.g. a security module comprising for example software protection mechanisms (e.g. cryptographic methods), mechanical protection devices (e.g. a lockable housing) or electrical protection devices (e.g. tamper protection or a protection system that erases the data of the security module in the event of impermissible use/handling of the blockchain oracle). In this case, the security module can comprise cryptographic keys, for example, which are necessary for calculating the checksums (e.g. transaction checksums or node checksums).

In association with embodiments of the invention, a "computer" or a "device" can be understood to mean for example a computer (system), a client, a smartphone, a device or a server, each of which is arranged outside the blockchain or is not a subscriber of the distributed database system (e.g. of the blockchain) (that is to say does not carry out operations with the distributed database system or only interrogates the latter, but without carrying out transactions, inserts data blocks or calculates proof-of-work verifications). Alternatively, a computer can also be understood to mean a node of the distributed database system. In other words, a device can be understood to mean a node of the distributed database system or else a device outside the blockchain or the distributed database system. A device outside the distributed database system can for example access the data (e.g. transactions or control transactions) of the distributed database system and/or be driven by nodes (e.g. by a smart contract and/or blockchain oracle). If for example driving or control of a device (e.g. a device embodied as a node or a device outside the distributed database system) is realized by a node, this can be effected e.g. by a smart contract stored in a transaction of the distributed database system.

In association with embodiments of the invention, a "predefined number of inquiry processing nodes" and the like should be understood to mean a predefined number of specific inquiry processing nodes The receivers of the predefined number of receivers correspond to the inquiry processing nodes of the predefined number of inquiry processing nodes.

Embodiments of the invention make it possible, to enable a decentralized infrastructure for the computer-aided control of the release or provision of resources (e.g. electricity, water, raw materials). Embodiments of the invention make it possible to achieve a high availability of the control system since, if e.g. part of the control system fails, it is possible to choose if appropriate corresponding nodes (e.g. inquiry processing nodes) that process the providing inquiry data set or the providing inquiry. In choosing the predefined number of inquiry processing nodes, it is possible to take account of node requests in order to calculate the object-specific authorization release. As a result, the object-specific authorization release can be optimized, for example, by e.g. a calculation time of a respective object-specific authorization release being improved (e.g. calculation time is minimized). For this purpose, for example, in choosing the inquiry processing nodes, it is possible to predefine node requests that e.g. predefine that a corresponding object-specific authorization release is calculated by a corresponding inquiry processing node within a predefined time. In this case, e.g. taking account of node properties, the control system determines which of the inquiry processing nodes are selected as receivers. Node properties can for example also be referred to as device-specific requests of the nodes.

In a first embodiment of the control system, the transmitter information comprises a digital signature and/or a unique identifier and/or a transmitter address and/or a cryptographic key.

The control system is advantageous to the effect of establishing more precisely an identity of a transmitter. By way of example, by cryptographic means (e.g. the digital signature), the providing inquiry data set can be protected or signed, such that this protection or digital signature is checkable on the basis of the transmitter information (for example, the cryptographic key may be a public key enabling the digital signature to be checked).

In further embodiments of the control system, the transmitter is the device, the object, a computer program, an application or a neural network.

In further embodiments of the control system, the resources are energy and/or water and/or raw materials and/or products and/or payment means.

In further embodiments of the control system, the transmitting is controlled by a state change of the object that is detected by a sensor, wherein for example the object comprises the sensor, and/or for example the transmitter comprises the sensor.

The control system is advantageous to the effect of automating the transmission in the event of a defect of the object or of an electronic component of the object being established, wherein the defect is established by the state change, for example. By way of example, upon the occurrence of a display defect (for example, the display is the electronic component) of a cellular phone/smartphone (the object), this defect can be detected by the sensor. If the object (e.g. the cellular phone/smartphone) is also the transmitter, for example, e.g. the transmission can be controlled by the state change. The providing request or the providing inquiry data set e.g. then requests a replacement part (e.g. a replacement display) as the resource. In this case, the control system checks (e.g. by the inquiry processing nodes and/or the authorization control module) for example whether corresponding replacement parts are available for the object and/or whether the transmitter is authorized to request replacement parts and/or whether the costs for exchange of the display for the transmitter are regarded as paid or have been paid. By way of example, data from a/the registration data set can be used for this purpose.

In further embodiments of the control system, the object-specific object data set comprises a unique identifier of the object and/or a state change of the object and/or a date of manufacture of the object and/or a value of the object and/or procurement costs of the object and/or an object state of the object at a predefined point in time and/or an object type and/or a manufacturer of the object. Alternatively or additionally, the object-specific object data set comprises for example an address of a data source for further information about the object. Alternatively or additionally, the object state is ascertained at a predefined point in time by a sensor of the object. Alternatively or additionally, the predefined point in time is the point in time of transmitting the providing inquiry data set or the point in time of the state change.

The control system is advantageous to the effect of ascertaining, by the further data source, publicly accessible data for example for ascertaining the number or quantity of the resource that is intended to be released/provided, for example.

In further embodiments of the control system, the object is a mobile device, a field device, a product, a gas turbine, a turbine, a wind turbine or a device, wherein the state change is a state change of a subcomponent of the object, and the subcomponent is an electronic component of the object.

In further embodiments of the control system, the providing request comprises a quantity or number of the resource to be provided, and/or the providing request comprises a destination or an address to which the resource is intended to be provided.

The control system is advantageous to the effect of rapidly establishing the quantity or number of the resource and for example automating the communication of the resource in a computer-aided manner, e.g. by the destination for the resource already being indicated.

In further embodiments of the control system, an authorization of the transmitter is checked during the checking of the transmitter.

The control system is advantageous to the effect of establishing whether the transmitter is actually authorized to make an inquiry. This can be useful, for example, in order to prevent denial of service attacks and/or to prevent data from non-authorized transmitters from being stored in the distributed database system.

In further embodiments of the control system, a quantity or a number of the resource to be provided is ascertained on the basis of the object-specific object data set.

The control system changes to the effect by calculating, by the inquiry processing nodes and/or by the authorization control module, for example, the quantity or the number of the resource to be provided in a computer-aided manner and/or in an automated manner. By way of example, various data of the object-specific object data set can be used for this purpose. For example, device information about the object can be used, e.g. manufacturer type, age, device type. If an exchange of an electronic component is intended to be controlled, for example, then the defective electronic component or electronic component to be exchanged can likewise be encompassed by the data, for example.

In further embodiments of the control system, the control system comprises a registration module for registering the object by a registration data set, wherein the registration data set comprises a unique identifier of the object and/or a date of manufacture of the object and/or a value of the object and/or procurement costs of the object and/or an object state of the object at a predefined point in time and/or an object type and/or a manufacturer of the object and/or an approved transmitter for the providing inquiry data set. Alternatively or additionally, for example the object state is ascertained at a predefined point in time by a sensor of the object (e.g. during registration and the object state is stored in the registration data set). Alternatively or additionally, the predefined point in time is a registration date of the object at the control system. Alternatively or additionally, the registration data set is stored in one or more transactions of the distributed database system.

The control system is advantageous to the effect of defining information about which resource is provided, if appropriate, for which object. Additionally or alternatively, by the registration data set, it is possible to define for example indications or prerequisites that must be fulfilled in order to release the corresponding resources. Additionally or alternatively, by the registration data set, it is possible to define for example indications or prerequisites or data in order to calculate the number or the quantity of the resource that is intended to be provided, if appropriate. The registration module can for example be an integral module of the distributed database system or be embodied separately from the latter.

In further embodiments of the control system, the distributed database system is a blockchain, or the distributed database system is a peer-to-peer database system.

In further embodiments of the control system, data blocks of the distributed database system are linked to one another via a cryptographic hash function (H).

In accordance with a further aspect, embodiments of the invention relates to a transmitter having:
- a first communication module for transmitting a providing inquiry data set, wherein
  - the providing inquiry data set comprises a providing request for a resource assigned to an object,
  - the providing inquiry data set comprises transmitter information of the transmitter of the providing inquiry data set,
  - the providing inquiry data set comprises an object-specific object data set for the object.

In accordance with a further aspect, embodiments of the invention relates to a distributed database system having:
- a multiplicity of nodes, wherein the nodes are connected to one another via a first communication network;
- a second communication module for receiving a providing inquiry data set, wherein
  - the providing inquiry data set comprises a providing request for a resource assigned to an object,
  - the providing inquiry data set comprises transmitter information of the transmitter of the providing inquiry data set,
  - the providing inquiry data set comprises an object-specific object data set for the object;
- a first checking module for checking the transmitter on the basis of the transmitter information, wherein the first checking module provides a corresponding transmitter checking result;
- a first storage module for storing the providing inquiry data set with the corresponding transmitter checking result in an inquiry transaction, wherein
  - the inquiry transaction is stored by the distributed database system,
  - the inquiry transaction communicates to a predefined number of receivers by the distributed database system,
  - the predefined number of receivers is ascertained on the basis of the transmitter checking result and/or the transmitter information and/or the object-specific object data set;
- a predefined number of inquiry processing nodes, wherein
  - the predefined number of inquiry processing nodes is the predefined number of receivers,
  - the inquiry processing nodes in each case ascertain an object-specific authorization release on the basis of the providing request, the object-specific object data set and the transmitter information,
  - the respective object-specific authorization releases are stored in transactions of the distributed database system;
- an authorization control module for ascertaining a total authorization release of the resource assigned to the object, wherein
  - the respective object-specific authorization releases of the respective inquiry processing nodes are taken into account for ascertaining the total authorization release;
  - the total authorization release is stored in transactions of the distributed database system;
- a resource release module, wherein
  - providing the resource assigned to the object is controlled by the total authorization release.

In accordance with a further aspect, embodiments of the invention relates to a (computer-implemented) method for the computer-aided control of providing resources comprising the following method steps:
- transmitting a providing inquiry data set by a first communication module, wherein
  - the providing inquiry data set comprises a providing request for a resource assigned to an object,
  - the providing inquiry data set comprises transmitter information of the transmitter of the providing inquiry data set,
  - the providing inquiry data set comprises an object-specific object data set for the object;
- receiving the providing inquiry data set;
- checking the transmitter on the basis of the transmitter information, wherein the first checking module provides a corresponding transmitter checking result;
- storing the providing inquiry data set with the corresponding transmitter checking result in an inquiry transaction, wherein
  - the inquiry transaction is stored by the distributed database system,
  - the inquiry transaction communicates to a predefined number of receivers by the distributed database system,
  - the distributed database system has a multiplicity of nodes that are connected to one another via a first communication network,
  - the predefined number of receivers is ascertained on the basis of the transmitter checking result and/or the transmitter information and/or the object-specific object data set;
- ascertaining an object-specific authorization release on the basis of the providing request, the object-specific object data set and the transmitter information by a predefined number of inquiry processing nodes, wherein
  - the predefined number of inquiry processing nodes is the predefined number of receivers,
  - for example the respective object-specific authorization releases are stored in transactions of the distributed database system;
- ascertaining a total authorization release of the resource assigned to the object, wherein
  - the respective object-specific authorization releases of the respective inquiry processing nodes are taken into account for ascertaining the total authorization release;
  - for example the total authorization release is stored in transactions of the distributed database system;

controlling of providing the resource assigned to the object by the total authorization release.

In further embodiments of the method, the method comprises further method steps for realizing the functional features or for realizing further features of the control system.

In accordance with a further aspect, embodiments of the invention relates to a (computer-implemented) method for the computer-aided transmission of a providing inquiry data set comprising the following method steps:

transmitting a providing inquiry data set by a first communication module, wherein
the providing inquiry data set comprises a providing request for a resource assigned to an object,
the providing inquiry data set comprises transmitter information of the transmitter of the providing inquiry data set,
the providing inquiry data set comprises an object-specific object data set for the object.

In further embodiments of the method, the method comprises further method steps for realizing the functional features or for realizing further features of the transmitter.

In accordance with a further aspect, embodiments of the invention relates to a (computer-implemented) method for the computer-aided control of providing resources comprising the following method steps:

receiving the providing inquiry data set, wherein,
the providing inquiry data set comprises a providing request for a resource assigned to an object,
the providing inquiry data set comprises transmitter information of the transmitter of the providing inquiry data set,
the providing inquiry data set comprises an object-specific object data set for the object;
checking the transmitter on the basis of the transmitter information, wherein the first checking module provides a corresponding transmitter checking result;
storing the providing inquiry data set with the corresponding transmitter checking result in an inquiry transaction, wherein
the inquiry transaction is stored by the distributed database system,
the inquiry transaction communicates to a predefined number of receivers by the distributed database system,
the distributed database system has a multiplicity of nodes that are connected to one another via a first communication network,
the predefined number of receivers is ascertained on the basis of the transmitter checking result and/or the transmitter information and/or the object-specific object data set;
ascertaining an object-specific authorization release on the basis of the providing request, the object-specific object data set and the transmitter information by a predefined number of inquiry processing nodes, wherein
the predefined number of inquiry processing nodes is the predefined number of receives,
for example the respective object-specific authorization releases are stored in transactions of the distributed database system;
ascertaining a total authorization release of the resource assigned to the object, wherein the respective object-specific authorization releases of the respective inquiry processing nodes are taken into account for ascertaining the total authorization release;
for example the total authorization release is stored in transactions of the distributed database system;
controlling of providing the resource assigned to the object by the total authorization release.

In further embodiments of the method, the method comprises further method steps for realizing the functional features or for realizing further features of the distributed database system.

Furthermore, a computer program product (non-transitory computer readable storage medium having instructions, which when executed by a processor, perform actions) comprising program instructions for carrying out the stated methods according to embodiments of the invention is claimed, wherein in each case one of the methods according to embodiments of the invention, all of the methods according to embodiments of the invention or a combination of the methods according to embodiments of the invention can be carried out by the computer program product.

In addition, a variant of the computer program product comprising program instructions for the configuration of a creating device, for example a 3D printer, a computer system or a production machine suitable for creating processors and/or devices, is claimed, wherein the creating device is configured with the program instructions in such a way that the stated distributed database system according to embodiments of the invention and/or the transmitter and/or the control system are/is created.

Furthermore, a providing apparatus for storing and/or providing the computer program product is claimed. The providing apparatus is for example a data carrier that stores and/or provides the computer program product. Alternatively and/or additionally, the providing apparatus is for example a network service, a computer system, a server system, a distributed computer system, a cloud-based computer system and/or a virtual computer system, which stores and/or provides the computer program product in the form of a data stream.

This providing takes place for example as a download in the form of a program data block and/or instruction data block, as a file, as a download file, or as a data stream, as a download data stream, of the complete computer program product. However, this providing can for example also take place as a partial download which consists of a plurality of parts and is downloaded via a peer-to-peer network or is provided as a data stream. Such a computer program product is read into a system for example using the providing apparatus in the form of the data carrier and executes the program instructions, such that the method according to embodiments of the invention is executed on a computer or configures the creating device in such a way that this creates the distributed database system according to embodiments of the invention and/or the transmitter and/or the control system.

BRIEF DESCRIPTION

Some of the embodiments will be described in detail, with reference to the following figures, wherein like designations denote like members, wherein:

FIG. 2 shows a further exemplary embodiment of the invention;

FIG. 3 shows a further exemplary embodiment of the invention;

FIG. 4 shows a further exemplary embodiment of the invention;

FIG. 5 shows a further exemplary embodiment of the invention; and

FIG. 6 shows a further exemplary embodiment of the invention.

DETAILED DESCRIPTION

Figure 1:
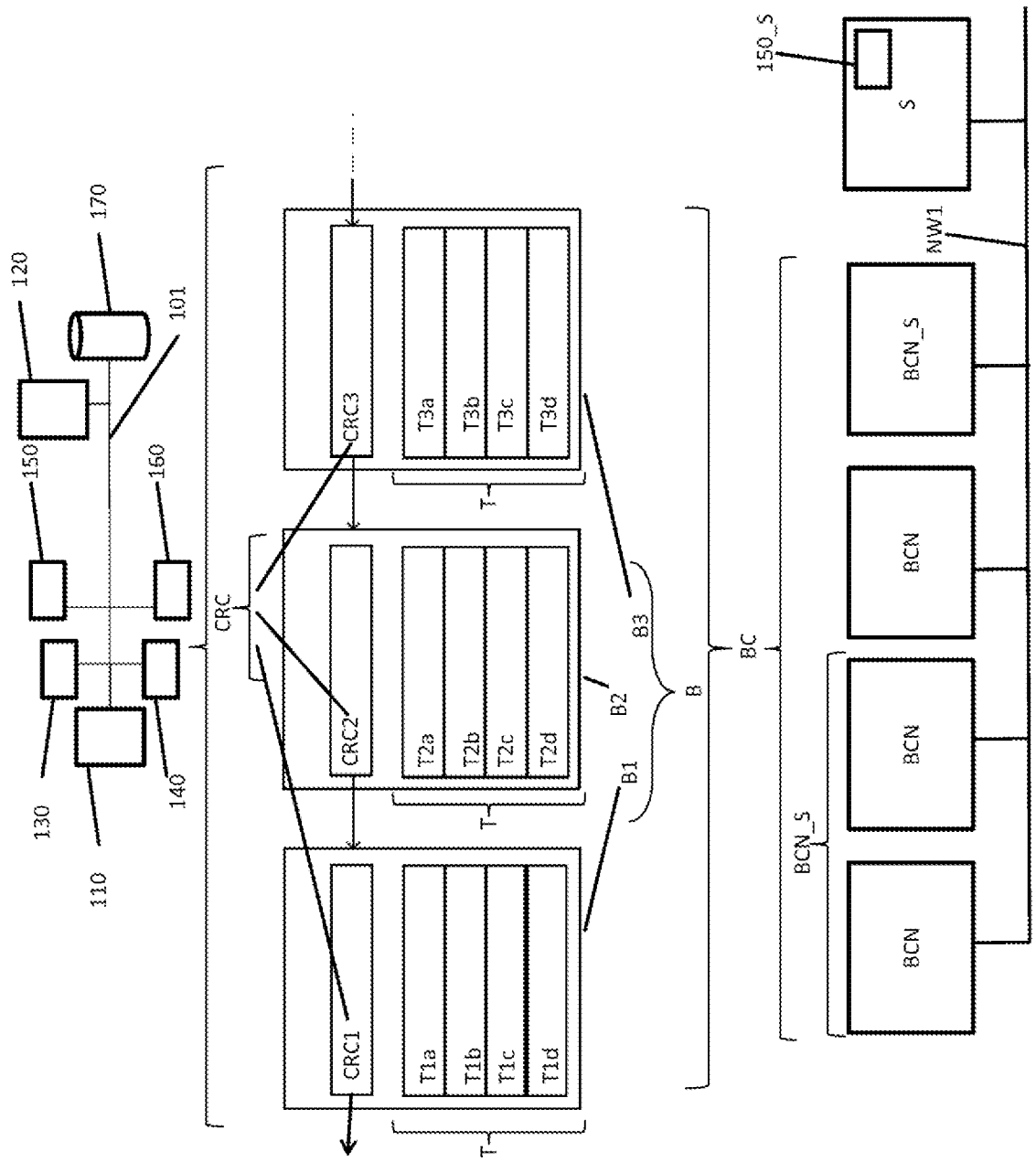
FIG. 1 shows a first exemplary embodiment of the invention.

The following exemplary embodiments, unless indicated otherwise or already indicated, comprise at least one processor and/or a storage unit in order to implement or carry out the method.

Moreover, a (relevant) person skilled in the art, with knowledge of the method claim/method claims, is of course aware of all routine possibilities for realizing products or possibilities for implementation in the conventional art, and so there is no need for independent disclosure in the description. These customary realization variants known to the person skilled in the art can be realized exclusively by hardware (components) or exclusively by software (components). Alternatively and/or additionally, the person skilled in the art, within the scope of his/her expert ability, can choose to the greatest possible extent arbitrary combinations according to embodiments of the invention of hardware (components) and software (components) in order to implement realization variants according to embodiments of the invention.

A combination according to embodiments of the invention of hardware (components) and software (components) can occur if one portion of the effects according to embodiments of the invention is brought about exclusively by special hardware (e.g. a processor in the form of an ASIC or FPGA) and/or another portion by the (processor- and/or memory-aided) software.

In view of the high number of different realization possibilities, it is impossible and also not helpful or necessary for the understanding of embodiments of the invention to name all these realization possibilities. In this respect, all the exemplary embodiments below are intended to demonstrate merely by way of example a few ways in which such realizations of the teaching according to embodiments of the invention could be manifested.

Consequently, the features of the individual exemplary embodiments are not restricted to the respective exemplary embodiment, but rather relate to embodiments of the invention in general. Accordingly, features of one exemplary embodiment can also serve as features for another exemplary embodiment, without this having to be explicitly stated in the respective exemplary embodiment.

FIG. 1 shows a first exemplary embodiment of the invention. In this case, FIG. 1 shows a control system for controlling and/or monitoring devices, wherein the distributed database system is realized by a blockchain BC, for example.

In specific detail, FIG. 1 shows blocks B, for example a first block B1, a second block B2 and a third block B3, of a blockchain BC, wherein here a segment of the blockchain BC is shown by way of example.

The blocks B each comprise a plurality of transactions T. In this case, the transactions T can comprise control transactions and/or confirmation transactions.

The first block B1 comprises for example a first transaction T1$a$, a second transaction T1$b$, a third transaction T1$c$ and a fourth transaction T1$d$.

The second block B2 comprises for example a fifth transaction T2$a$, a sixth transaction T2$b$, a seventh transaction T2$c$ and an eighth transaction T2$d$.

The third block B3 comprises for example a ninth transaction T3$a$, a tenth transaction T3$b$, an eleventh transaction T3$c$ and a twelfth transaction T3$d$.

The blocks B each additionally also comprise one of the linking checksums CRC, which is formed depending on the direct predecessor block. Consequently, the first block B1 comprises a first linking checksum CRC1 from its predecessor block, the second block B2 comprises a second linking checksum CRC2 from the first block B1, and the third block B3 comprises a third linking checksum CRC3 from the second block B2.

The respective linking checksum CRC1, CRC2, CRC3 is formed by way of the block header of the corresponding predecessor block. The linking checksums CRC can be formed using a cryptographic hash function such as e.g. SHA-256, KECCAK-256 or SHA-3. By way of example, the linking checksum can additionally be calculated by way of the data block checksum or the header comprises the data block checksum (the data block checksum is explained below).

In addition, each of the blocks can comprise a data block checksum. The latter can be realized by a hash tree, for example.

In order to form the hash tree, a transaction checksum (e.g. likewise a hash value) is calculated for each transaction of a data (block). Alternatively or additionally, a transaction checksum that was created by the generator of the transaction during the generation of the transaction can continued to be used for this purpose.

Usually, for a hash tree, a Merkle tree or a Patricia tree is used, for example, the root hash value/root checksum of which is stored as a corresponding data block checksum in the respective blocks.

In one variant, the data block checksum is used as the linking checksum.

A block can furthermore have a time stamp, a digital signature, a proof-of-work verification, as has been explained in the embodiments of the invention.

The blockchain BC itself is realized by a blockchain infrastructure having a plurality of blockchain nodes BCN, BCN_D. The nodes can be for example computers, blockchain oracles, trustworthy nodes or one or a plurality or all of the devices which are intended to be controlled or monitored. In other words, the devices can either be embodied as blockchain nodes, which are then referred to for example as device nodes BCN_D. Devices which for example are not embodied as blockchain nodes and for example have only reading access to the blockchain are referred to as blockchain-external devices D. The nodes are communicatively connected to one another via a first network NW1 (e.g. a communication network such as the Internet or an Ethernet network). The blockchain infrastructure, for example at least one portion of the data blocks B or all of the data blocks B of the blockchain BC is/are replicated for a portion or all of the nodes of the blockchain.

Devices can be understood to mean blockchain-external devices D or device nodes BCN_D.

The control system comprises a transmitter S having a first communication module 150_S and a distributed database system (e.g. the blockchain BC). The blockchain BC comprises a first checking module 110, a first storage module 120, an authorization control module 130, a resource release module 140, an optional registration module 170 and a second communication module 150, which are communicatively connected to one another via the control system (e.g. a bus 101) or via the blockchain and the infrastructure thereof (e.g. the first network NW1). The transmitter S can for example likewise be communicatively connected to the distributed database system via the control system or via the blockchain and the infrastructure thereof. The first (communication) network NW1 here can be a mobile radio network, an Ethernet network, a WAN, a LAN or the Internet. Moreover, the blockchain BC comprises a multiplicity of nodes BCN, a predefined number of inquiry processing nodes BCN_S likewise being shown.

The transmitter S is designed for transmitting a providing inquiry data set by a first communication module, wherein the providing inquiry data set comprises a providing request for a resource assigned to an object. The providing inquiry data set comprises transmitter information of the transmitter and comprises an object-specific object data set for the object. The transmitter S and/or the object have/has been registered for example in the control system at a first point in time by a registration data set. The transmitting is effected at a second point in time succeeding the first point in time.

In one simple example, the transmitter S can be a smartphone, in which an electronic component (e.g. the display of the smartphone) is monitored by a sensor. In this example, the transmitter S and the object are identical, but can also differ from one another. Firstly, at the first point in time, for example, the transmitter S is registered by the registration module 170, for example by the registration data set for the transmitter S or the object being stored in a transaction of the distributed database system. The registration data set also comprises transmitter information or a portion of the transmitter information, for example. The registration data set also comprises the object-specific object data set or a portion of the object data set, for example.

The transmitter information is information about the transmitter (e.g. an entity) which makes the transmitter uniquely identifiable vis-à-vis the control system, for example, over the entire operative run time of the control system. For this purpose, the transmitter information comprises for example a unique identification formed from properties of the transmitter. To that end, specific properties are used for example according to the type of transmitter. In the case of a human user, they are name, date of birth, zip code and biometric data such as a fingerprint and iris. In the case of computer programs, Apps or devices, cryptographic data can be provided or formed for these transmitters, for example. For this purpose, credentials/cryptographic key material (e.g. digital signatures, passwords, etc.) can be read from a secure storage unit and be communicated/provided or cryptographic checksums are formed for the computer program or over parts of an operating system of the device and are communicated/provided. Moreover, the data of a human user can be stored in a (secure) storage unit and can be communicated/provided by the device and/or computer program. This is done in an automated manner. During communicating/providing, the corresponding data are stored in the registration data set and communicated to the control system or the distributed database system. Such a registration inquiry is then checked for example by the registration module 170 (e.g. are all necessary data for a registration present). Depending on the checking result, the registration data set can then be stored in the transactions of the distributed database system. If the checking is successful, the registration data set is stored and the transmitter obtains a confirmation data set comprising for example a license or cryptographic keys confirming the successful registration.

In one variant computer programs or Apps can be provided by the control system. These computer programs comprise e.g. the data for a human user, with the difference that they are stored e.g. in the program or the App together with the license.

Transmitter types are for example neural networks, mobile devices, industrial installations, human beings, computer programs or Apps.

The object-specific object data set which the registration data set comprises or stores, for example, comprises e.g. the corresponding information of the device type about a device/transmitter (e.g. the smartphone) in order that the device can be uniquely referenced and identified as necessary over the entire operative run time of the control system.

In the case of a smartphone device class, for example, the object data set comprises IMEI number, manufacturer, type, date of purchase and a verification of the correct state, effected by way of an App to be installed in advance (e.g. a/the computer program that was provided by the control system).

With the aid of the sensors and functions present in the smartphone, for example, the App checks whether the device is functioning satisfactorily, whether the display of the device exhibits broken glass. If for example a state change for the display is then identified by the sensors (e.g. the display is defective or broken), the providing inquiry data set is transmitted by the smartphone—as explained above.

In a further variant, during the registration on the basis of these data (e.g. on the basis of the data of the registration data set or the object-specific object data set) on the basis of these data or object data a number or a quantity of the resource is calculated which is intended to be provided, if appropriate, in the event of a providing request or upon reception of the providing inquiry data set. The calculation is effected for example on the basis of historical data of the control system and/or historical data about the object and/or data from publicly accessible sources and is stored in the control system or stored in a transaction of the distributed database system. This transaction likewise comprises the registration data set. The publicly accessible sources are ascertained on the basis of the object-specific object data set. The calculation is carried out by a calculation module of the control system and/or the distributed database system, wherein the calculation module comprises interfaces in order, if appropriate, to access the requisite data (sources) (e.g. public data sources, the distributed database system).

This value (that is to say the number or the quantity of the resource) is fixedly assigned as resource to the object in the control system and from this point in time on is subject to an aging mechanism, based on the periodically updated values for the object. In this case, fixedly assign means, that this value (that is to say the number or the quantity of the resource) is stored in a transaction of the distributed database system. This transaction likewise comprises the registration data set. If the registration data set is stored for example in a transaction of the distributed database system, the registration data set or the corresponding transaction can be assumed or previously executed control commands or assumed/previously executed control transactions which e.g. have to be executed in order to process or to accept a providing inquiry data set.

The aging mechanism takes account of a resource loss (in terms of number or quantity) for the object depending on the production date, original resource (value), and the current statistically averaged value from publicly accessible sources and the frequency of damage that has occurred. For all transmitters and/or control systems, this value serves as a basis for a possible value exchange and risk protection.

The resource loss and/or the number and/or the quantity of the resource to be released for the object continues to be used for other objects. By way of example, the calculation of the resource loss and/or the number and/or the quantity of the resource to be released for the object can be accelerated if these values have already been ascertained in the first place for an object of identical type or an equivalent object. When ascertaining values, the calculation module can check for example whether these values have already been ascertained in the first place for an object of identical type or an equivalent object (e.g. a smartphone of a specific type). If this is the case, the corresponding values need not be ascertained anew, but rather can simply be adopted. If corresponding values are not yet available, they can—as explained above—be ascertained and be stored (e.g. in transactions of the distributed database system) and continue to be used for an object for which these values are to be ascertained at a later point in time.

If the registration of the object and/or of the transmitter was able to be carried out successfully, for example state changes of the object can be directed as providing inquiries (which are stored e.g. in the providing inquiry data set) to the control system or to the distributed database system. These state changes may be for example instances of damage or malfunctions of the registered device.

These providing inquiries/providing inquiry data sets can be processed by a smart contract/executable program code, for example. The smart contract compares e.g. the data about transmitter (e.g. entity), object (e.g. smartphone) and state change of the object (e.g. breaking of the display), the data being communicated during this providing inquiry, with the data stored in the control system or in the distributed database system.

Transmitting a providing inquiry data set, this transmitting being controlled by a state change, comprises for example the information about the state change. This information about the state change is e.g. the date of occurrence of the state change, and a verification such as, for example, a document, a photograph or a third party confirmation. This information about the state change, the control system can ascertain whether the corresponding resources are released. This state change is stored for example by a transaction as a linked blockchain or in the distributed database system. The object-specific object data set of the providing inquiry data set comprises the information about the state change.

The second communication module 150 of the blockchain BC is designed for receiving the providing inquiry data set. The second communication module 150 (like the first communication module 150_S) may be for example a network card, a network interface or a WLAN module.

The first checking module is designed for checking the transmitter on the basis of the transmitter information, wherein the first checking module provides a corresponding transmitter checking result. The checking can be effected on the basis of the registration data set, for example, in order to establish whether the corresponding transmitter is registered and the latter is authorized to make corresponding inquiries. For this purpose, the registration module can check whether an associated registration data set is present for a corresponding transmitter or the transmitter information thereof and/or for the object or for the object data set. If the registration data sets are stored in the distributed database system, for example, these data can be retrieved directly from the distributed database system. By way of example, the associated registration data set can be loaded on the basis of a unique identifier for the transmitter and/or the object, wherein the corresponding identifiers were correspondingly saved or stored during the registration for example by the transmitter information and/or the object-specific object data set. If the transmitter information comprises a corresponding unique identifier and/or the object-specific object data set comprises a corresponding unique identifier matching the corresponding identifier(s) of the registration data set, the providing inquiry data set is processed further. In other words, the providing inquiry data set is processed further by the distributed database system if the transmitter information and/or the object-specific object data set of the providing inquiry data set at least partly match(es) the transmitter information and/or the object-specific object data set of the registration data set (e.g. by virtue of the corresponding unique identifiers matching).

In one variant, providing inquiries that cannot be carried out successfully (for example on account of erroneous inputs) are accepted after the third transmission or reception with a time delay according to the following algorithm:

$$T_n = T_{n-1} \times n \text{ with for } T_4 = 5 \text{ seconds}, T_{0-3} = 0 \text{ seconds}.$$

In this case, T is the time delay and n indicates the number of attempts to transmit a providing inquiry.

The first storage module is designed for storing the providing inquiry data set with the corresponding transmitter checking result in an inquiry transaction (this is e.g. a transaction that comprises the corresponding data). In this case, the inquiry transaction is stored by the distributed database system (e.g. the inquiry transaction is validated by the blockchain and/or stored in a block of the blockchain—e.g. this is stored after validation). The providing inquiry data set having the providing request can for example also be referred to as a control data set, the providing request being control commands.

The inquiry transaction is communicated to a predefined number of receivers by the distributed database system.

In this case, the predefined number of receivers is ascertained on the basis of the transmitter checking result and/or the transmitter information and/or the object-specific object data set and/or the providing inquiry data set. In specific detail, the aforementioned information or a combination of the aforementioned information is used as a basis for determining which nodes of the distributed database system or which devices (e.g. devices which are not nodes of the blockchain or of the distributed database system) are selected as inquiry processing nodes BCN_S. Inquiry processing nodes are understood to mean nodes or devices which are a node of the distributed database system (internal nodes), or a device/node which is external to the distributed database system. Such external nodes can access the distributed database system via an interface, for example.

In choosing the predefined number of inquiry processing nodes (e.g. external nodes and/or internal nodes) it is possible to take account of node requests in order to calculate the object-specific authorization release. As a result, the object-specific authorization release can for example be optimized, e.g. by a calculation time of a respective object-specific authorization release being improved (e.g. calculation time is minimized). For this purpose, in choosing the inquiry processing nodes, for example, the node requests can be predefined in such a way that a corresponding object-specific authorization release is calculated by a corresponding inquiry processing node within a predefined time. In this case, taking account of node properties, for example, the control system determines which of the inquiry processing nodes are selected as receivers. Alternatively or additionally, node requests may be, for example, that a corresponding node has protection mechanisms (e.g. data are protected against access by unauthorized entities for example by passwords or user authentication), in order to fulfill data protection directives, for example, and/or a corresponding node satisfies location-related requirements (e.g. the nodes are permitted to be situated only within Germany).

In order to determine the corresponding nodes (e.g. external nodes and/or internal nodes) and the number thereof, the distributed database system or the control system can comprise a determining module, in which the corresponding data of the nodes (e.g. location-related position of the nodes, calculation speed, protection mechanisms) are stored. The nodes update these node data or node properties in an automated manner at the determining module. The providing inquiry data set can predefine for example the node requests and/or a minimum number of the predefined number of inquiry processing nodes. Alternatively or additionally, the determining module can ascertain the node requests and/or the predefined number of inquiry processing nodes on the basis of the transmitter checking result and/or the transmitter information and/or the object-specific object data set and/or the providing inquiry data set. For this purpose, the determining module takes account for example of the data protection directives which are applicable to a corresponding transmitter. To that end, the transmitter information is evaluated, for example, which comprises location information about the transmitter, for example. On the basis of the location, for example the corresponding data protection directives are ascertained and for example nodes which fulfill the data protection directives are selected as inquiry processing nodes.

Consequently, in one simple case, the predefined number of inquiry processing nodes corresponds to the predefined number of receivers.

The respective inquiry processing nodes are designed to ascertain an object-specific authorization release on the basis of the providing request (e.g. by the providing inquiry data set), the object-specific object data set and the transmitter information, wherein the respective object-specific authorization releases are stored in transactions of the distributed database system and, by the distributed database system, are communicated to the authorization control module or are provided to the latter.

In order to calculate the corresponding object-specific authorization releases and to determine the inquiry processing nodes, for example the following values can be ascertained and/or stored (e.g. in the determining module and/or in transactions of the distributed database system).

$E\_total$=total number of all inquiry processing nodes that are successful in the system, wherein an inquiry processing node may for example also be a transmitter. A transmitter that is an inquiry processing node cannot for example be an inquiry processing node for a providing request which it itself has transmitted. This is checked by the checking module and/or determining module and, if appropriate, taken into account in choosing the inquiry processing nodes.

$E\_active$=sum of the active sessions (e.g. the inquiry processing node has connected to the control system at least once and has exchanged a status message, for example) of an inquiry processing node within a predefined time period (e.g. the last four quarters) at the control system after successful logging on or registration or installation of the inquiry processing nodes.

$E\_vote$=number of object-specific authorization releases ascertained per inquiry processing node within a predefined time period (e.g. the last four quarters).

$NVmin$=minimum required number of inquiry processing nodes that are intended to ascertain an object-specific authorization release.

$NVmax$=maximum required number of inquiry processing nodes that are intended to ascertain an object-specific authorization release.

$E\_Voter$=selected inquiry processing nodes and the number thereof.

$E\_similar\_device\_cl$=number of transmitters with an object, wherein their object is assigned the same device class (e.g. smartphones, TFT display, tablets).

$E\_similar\_device\text{-}Manufac$=number of transmitters with objects from the same manufacturer.

The selected inquiry processing nodes and the number thereof can be ascertained for example as illustrated in the variant below.

If (($E\_similar\_device\_cl$)>$NVmin$ && ($E\_similar\_device\_cl$)<$NVmax$)) then
{
    $E\_Voter = E\_similar\_device\_cl = 0.8 + random (E\_active) * 0.2 = NVmax$
}
If ($E\_similar\_device\_cl$)>$NVmax$
{
    $E\_Voter = random (E\_similar\_device\_cl) = NVmax$
}
If ($E\_similar\_device\_cl$)<$NVmin$ then
{
    $E\_Voter = E\_similar\_device\_cl \ x + random (E\_active) = NVmax$
}

The control system or the distributed database system performs the communication of the inquiry transaction to the inquiry processing nodes. By way of example, the inquiry transaction is communicated to internal nodes directly by the replication of the data (blocks) of the blockchain. In the case of external nodes, these nodes can either check independently within a predefined time interval whether an inquiry transaction is present for them. This can be done, for example, by virtue of the fact that, via a database interface, the external nodes can obtain access to the distributed database system and read the transactions stored therein. Alternatively, the control system or the determining module reads the inquiry transaction for corresponding inquiry processing nodes and communicates or transmits this inquiry transaction to the corresponding inquiry processing nodes.

The inquiry processing nodes (internal and/or external nodes) then calculate—as illustrated above—in each case an object-specific authorization release on the basis of the providing request, the object-specific object data set and the transmitter information. By way of example, the providing inquiry data set can also be taken into account in this calculation.

The respective object-specific authorization releases are stored in transactions of the distributed database system. In the case of internal nodes, the node stores this transaction itself in the blockchain (and the transaction is validated for example). In the case of external nodes, this storage is realized by a blockchain oracle or a database interface. For this purpose, the corresponding transaction is communicated to the distributed database system by the blockchain oracle or the database interface and the storage and validation are then performed by the database system or the infrastructure thereof.

The authorization control module 130 is designed for ascertaining a total authorization release of the resource assigned to the object, wherein, in order to ascertain the total authorization release, the respective object-specific authorization releases of the respective inquiry processing nodes are taken into account and the total authorization release is stored in transactions of the distributed database system. The authorization control module 130 is designed for ascertaining a total authorization release for the resource(s) assigned to the object.

In other words, the predefined number of inquiry processing nodes or the selected inquiry processing nodes are informed, by the inquiry transaction, that they are intended to ascertain an object-specific authorization release for the object or the providing inquiry data set. For this purpose, the inquiry transaction can comprise for example unique identifiers (or UIDs) of the inquiry processing nodes and/or the corresponding inquiry processing nodes are informed, by a separate control message, that a corresponding inquiry transaction has been provided and the corresponding inquiry processing nodes can or are intended to retrieve it. The retrieval by the inquiry processing nodes is controlled by the control message, for example, by virtue of the latter comprising a unique identifier for the inquiry transaction, for example.

The corresponding inquiry processing nodes take a mutually independent individual decision indicating whether or not the resources are provided.

The requisite process steps and the individual decisions are handled as a transaction and/or by a corresponding smart contract.

For ascertaining (this is computer-aided and automated) the total authorization release, the following values are calculated:

$$\text{Entities\_Voters\_act\_min} = \text{Factor} * E\_\text{Voters} \quad 0.51 < \text{Factor} < 0.9$$

The authorization control module 130 supplies for example the optimum value for <Factor> taking account of the predefined number of inquiry processing nodes, the history of the process for total authorization releases regarding how active the selected inquiry processing nodes were (e.g. how often and for how long the corresponding inquiry processing nodes were logged onto the control system or were connected thereto) and the probability of at least 51% of the object-specific authorization releases confirming the provision of the resource for the object. Alternatively or additionally, it may be demanded, for example, that at least 51% of the inquiry processing nodes have ascertained a corresponding object-specific authorization release that the authorization control module can take into account. By way of example, here E_voters are the inquiry processing nodes selected for the current case or else indicate the number thereof. In other scenarios, a value of 51% need not necessarily be chosen. Other values can also be chosen here in other cases, for example.

The total authorization release can be ascertained for example as follows:

T_Vote_max1=maximum permitted time (duration) in which a first calculation of the total authorization releases can or is intended to be carried out.

T_Vote_max2=T_Vot_max1/10

T_Vote_min1=maximum permitted time (duration) in which a first calculation of the total authorization releases can or is intended to be carried out.

T_Vote_neg=T_Vote_max1/10

T-Vote_Phase2_max=maximum permitted time (duration) in which a second calculation of the total authorization releases can or is intended to be carried out.

For the calculation of the total authorization release, for example the authorization control module 130 takes account of the following parameters and relates them to one another:

1) the object-specific authorization releases confirm (e.g. all of the object-specific authorization releases confirm this) the release of the resource (positive decision) and the predefined number of inquiry processing nodes have output their respective object-specific authorization release in the time period≤T_Vote_min1. The result of the total authorization release that was calculated on the basis of these data indicates that the resource is released or provided. This is then implemented by the control system or by the resource release module 140, for example.

2) The object-specific authorization releases confirm (e.g. all of the object-specific authorization releases confirm this) the release of the resource (positive decision) and a substep of the predefined number of inquiry processing nodes have calculated and provided their respective object-specific authorization release in the time period-≤T_Vote_max1. If the substep is >50% of the predefined number of inquiry processing nodes, the further procedure is as under 1). If the substep is ≤50% of the predefined number of inquiry processing nodes, the calculation of the object-specific authorization releases is repeated by the predefined number of inquiry processing nodes. For this purpose, a corresponding control message can be transmitted to the predefined number of inquiry processing nodes or replacement nodes are selected for the inquiry processing nodes (e.g. by the determining module) which did not reply in a timely manner. The maximum time (duration) for this second calculation of the total authorization release corresponds to T_Vote_max2. If for example a majority of the object-specific authorization releases confirm the release or provision of the resource, the calculation of the total authorization release likewise produces a confirmation of the provision of the resource. In this case, a majority of the object-specific authorization releases means, that more than 50% of all expected object-specific authorization releases confirm the provision of the resource.

3) At least one of the object-specific authorization releases prohibits the provision of the resource for the object (negative decision). Independently of the result and the number of other object-specific authorization releases with regard to T_Vote_max1, the control system stops the calculation of the object-specific authorization releases and/or of the total authorization release. The inquiry processing nodes that ascertain or have calculated negative decision are requested or triggered to communicate the basis/data for the negative decision. These data may be documents, certificates, witness testimonies, written indications, plausibility values ascertained by neural networks, comparisons with other databases (e.g. the smartphone had already been localized at a different location by way of a geolocation service). These data are then communicated to E_Voters by the control system. E_Voters may be e.g. the specific inquiry processing nodes that had already been determined beforehand. Alternatively, a newly predefined number of inquiry processing nodes can be ascertained and correspondingly new inquiry processing nodes can then be selected, which can e.g. also comprise a portion of the inquiry processing nodes already selected beforehand. Alternatively, the predefined number of inquiry processing nodes that had already been ascertained is maintained, wherein for this number new inquiry processing nodes are selected, which can e.g. also comprise a portion of the inquiry processing nodes already selected beforehand. The calculation of the object-specific authorization releases is then carried out again within the time period T_Vote_Phase2_max. In this case, for example, the neural networks of the inquiry processing nodes calculate their respective object-specific authorization releases on the basis of the data. If all the newly calculated object-specific authorization releases are positive (have calculated a positive decision), the further procedure is as under 1 and the total authorization release confirms the release of the resource. If the newly calculated object-specific authorization releases comprise at least one negative decision, the calculation of the object-specific authorization releases and/or of the total authorization release is terminated and providing the resource is prevented.

In this case, the resource release module 140 is configured in such a way that providing the resource assigned to the object is controlled by the total authorization release. If the total authorization release confirms the release of the resource, for example, the resources are released. If the total authorization release does not allow the release of the resourced, for example, the release of the resource is prevented.

In a further variant, the first checking module 110 and/or the first storage module 120 and/or the authorization control module 130 and/or the resource release module 140 and/or inquiry processing nodes and/or a portion of the inquiry processing nodes and/or the optional registration module 170 and/or the second communication module 150 are embodied as elements/components of the distributed database system. By way of example, the elements/components are integral elements/components of the distributed database system.

In a further variant, the first checking module 110 and/or the first storage module 120 and/or the authorization control module 130 and/or the resource release module 140 and/or the optional registration module 170 and/or inquiry processing nodes and/or a portion of the inquiry processing nodes and/or the second communication module 150 are embodied as elements/components separate from the distributed database system.

In one implementation variant, one module, a plurality of modules or all of the modules can be realized as a software component (e.g. as a smart contract) or as a hardware component or as a combination of hardware and software components.

As a software component, a corresponding module can be realized as a smart contract, for example, which is implemented by the blockchain or the infrastructure thereof. For this purpose, the smart contract is stored in transactions, for example, which are in turn stored in data blocks or blocks of the blockchain BC.

As a hardware component, a corresponding module can be realized by a blockchain oracle and/or a node/device of the blockchain, for example, which are trustworthy and sign the corresponding data/transactions by a digital certificate or digital signatures.

The control system and/or the modules and/or the inquiry processing nodes and/or the transmitter and/or the object and/or the distributed database system and/or the nodes of the distributed database system (e.g. blockchain nodes, devices (device nodes and blockchain-external devices)) can for example each additionally also comprise one further or a plurality of further component(s) such as, for example, a processor, a storage unit, further communication interfaces (e.g. Ethernet, WLAN), an input device, a computer keyboard or a computer mouse, and a display device (e.g. a monitor). The processor can comprise a plurality of further processors, for example, which can be used for realizing further exemplary embodiments. The further component(s) can for example likewise be communicatively connected to one another via the blockchain or the infrastructure thereof.

The processor can be an ASIC, for example, which was realized in an application-specific manner for the function of a respective module or of all the modules of the exemplary embodiment (and/or of further exemplary embodiments), wherein the program component or the program instructions is/are realized as integrated circuits, in particular. The processor can also be an FPGA, for example, which is configured by the program instructions in such a way that the FPGA realizes the functions of a respective module or of all the modules of the exemplary embodiment (and/or of further exemplary embodiments).

In a further implementation variant, the control system comprises the following:
 a transmitter for transmitting a providing inquiry data set by a first communication module, wherein
  the providing inquiry data set comprises a providing request for a resource assigned to an object,
  the providing inquiry data set comprises transmitter information of the transmitter of the providing inquiry data set,
  the providing inquiry data set comprises an object-specific object data set for the object; a distributed database system having
 a multiplicity of nodes, wherein the nodes are connected to one another via a first communication network;
 a second communication module for receiving the providing inquiry data set;
 a first storage module for storing the providing inquiry data set in an inquiry transaction, wherein
  the inquiry transaction is stored by the distributed database system,
  the inquiry transaction communicates to a predefined number of receivers by the distributed database system,
  the predefined number of receivers is ascertained on the basis of the transmitter information and/or the object-specific object data set and/or the providing inquiry data set;
 a predefined number of inquiry processing nodes, wherein
  the predefined number of inquiry processing nodes is the predefined number of receivers,
  in each case the inquiry processing nodes ascertain an object-specific authorization release on the basis of the providing request (e.g. taking account of the object-specific object data set and the transmitter information),
  the respective object-specific authorization releases are stored for example in transactions of the distributed database system;
 an authorization control module for ascertaining a total authorization release of the resource assigned to the object, wherein
  the respective object-specific authorization releases of the respective inquiry processing nodes are taken into account for ascertaining the total authorization release;

the total authorization release is stored for example in transactions of the distributed database system.

In a further implementation variant, the control system comprises the following:
- a transmitter for transmitting a providing inquiry data set by a first communication module, wherein
  - the providing inquiry data set comprises a providing request for a resource assigned to an object,
  - the providing inquiry data set comprises transmitter information of the transmitter of the providing inquiry data set,
  - the providing inquiry data set comprises an object-specific object data set for the object; a distributed database system having
  - a multiplicity of nodes, wherein the nodes are connected to one another via a first communication network;
- a second communication module for receiving the providing inquiry data set;
- a first storage module for storing the providing inquiry data set in an inquiry transaction, wherein
  - the inquiry transaction is stored by the distributed database system,
  - the inquiry transaction communicates to a predefined number of receivers by the distributed database system,
  - the predefined number of receivers is ascertained on the basis of the transmitter information and/or the object-specific object data set and/or the providing inquiry data set;
- a predefined number of inquiry processing nodes, wherein
  - the predefined number of inquiry processing nodes is the predefined number of receivers,
  - in each case the inquiry processing nodes ascertains an object-specific authorization release on the basis of the providing request (e.g. taking account of the object-specific object data set and the transmitter information),
  - the respective object-specific authorization releases are stored for example in transactions of the distributed database system;
- an authorization control module for ascertaining a total authorization release of the resource assigned to the object, wherein
  - the respective object-specific authorization releases of the respective inquiry processing nodes are taken into account for ascertaining the total authorization release;
  - the total authorization release is stored for example in transactions of the distributed database system.

In a further implementation variant, the control system comprises the following:
- a transmitter for transmitting a providing inquiry data set by a first communication module, wherein
  - the providing inquiry data set comprises a providing request for a resource assigned to an object,
  - the providing inquiry data set comprises transmitter information of the transmitter of the providing inquiry data set,
  - the providing inquiry data set comprises an object-specific object data set for the object; a distributed database system having
  - a multiplicity of nodes, wherein the nodes are connected to one another via a first communication network;
- a second communication module for receiving the providing inquiry data set;
- a first checking module for checking the transmitter on the basis of the transmitter information, wherein the first checking module provides a corresponding transmitter checking result;
- a first storage module for storing the providing inquiry data set with the corresponding transmitter checking result in an inquiry transaction, wherein
  - the inquiry transaction is stored by the distributed database system,
  - the inquiry transaction communicates to a predefined number of receivers by the distributed database system,
  - the predefined number of receivers is ascertained on the basis of the transmitter checking result and/or the transmitter information and/or the object-specific object data set and/or the providing inquiry data set;
- a predefined number of inquiry processing nodes, wherein
  - the predefined number of inquiry processing nodes is the predefined number of receivers,
  - in each case the inquiry processing nodes ascertain an object-specific authorization release on the basis of the providing request, the object-specific object data set and the transmitter information,
  - the respective object-specific authorization releases are stored in transactions of the distributed database system;
- an authorization control module for ascertaining a total authorization release of the resource assigned to the object, wherein
  - the respective object-specific authorization releases of the respective inquiry processing nodes are taken into account for ascertaining the total authorization release;
  - the total authorization release is stored in transactions of the distributed database system;
- a resource release module, wherein
  - providing the resource assigned to the object is controlled by the total authorization release.

In a further implementation variant, the control system comprises the following:
- a transmitter for transmitting a providing inquiry data set by a first communication module, wherein
  - the providing inquiry data set comprises a providing request for a resource assigned to an object,
  - the providing inquiry data set comprises transmitter information of the transmitter of the providing inquiry data set,
  - the providing inquiry data set comprises an object-specific object data set for the object; a distributed database system having
  - a multiplicity of nodes, wherein the nodes are connected to one another via a first communication network;
- a second communication module for receiving the providing inquiry data set;
- a first storage module for storing the providing inquiry data set in an inquiry transaction, wherein
  - the inquiry transaction is stored by the distributed database system,
  - the inquiry transaction communicates to a predefined number of receivers by the distributed database system,
  - the predefined number of receivers is ascertained on the basis of the transmitter information and/or the object-specific object data set and/or the providing inquiry data set;

a predefined number of inquiry processing nodes, wherein
the predefined number of inquiry processing nodes is the predefined number of receivers,
in each case the inquiry processing nodes ascertains an object-specific authorization release on the basis of the providing request (e.g. taking account of the object-specific object data set and the transmitter information),
the respective object-specific authorization releases are stored for example in transactions of the distributed database system;
an authorization control module for ascertaining a total authorization release for the resource assigned to the object, wherein
the respective object-specific authorization releases of the respective inquiry processing nodes are taken into account for ascertaining the total authorization release;
the total authorization release is stored for example in transactions of the distributed database system.

In a further implementation variant, the first storage module is embodied as a separate module and comprises:
a communication module for receiving a providing inquiry data set;
a determining module for ascertaining a predefined number of receivers on the basis of the transmitter information and/or the object-specific object data set and/or the providing inquiry data set;
an (integral) storage module for storing the providing inquiry data set in an inquiry transaction, wherein
the inquiry transaction is stored by a/the distributed database system,
the inquiry transaction communicates to the predefined number of receivers by the distributed database system.

In a further implementation variant, the authorization control module is embodied as a separate module and comprises:
a communication module for receiving respective object-specific authorization releases for a resource assigned to an object;
an (internal) authorization control module for ascertaining a total authorization release for the resource assigned to the object, wherein
the respective object-specific authorization releases of the respective inquiry processing nodes are taken into account for ascertaining the total authorization release;
the total authorization release is stored for example in transactions of the distributed database system.

The modules are connected to the first network NW1 via their corresponding communication modules, for example, such that the corresponding data can be exchanged in the control system.

In a further implementation variant, the control system comprises the following:
a transmitter for transmitting a providing inquiry data set by a first communication module, wherein
the providing inquiry data set comprises a providing request for a resource assigned to an object,
the providing inquiry data set comprises transmitter information of the transmitter of the providing inquiry data set,
the providing inquiry data set comprises an object-specific object data set for the object; a distributed database system having
a multiplicity of nodes, wherein the nodes are connected to one another via a first communication network;
a second communication module for receiving the providing inquiry data set;
a first storage module for storing the providing inquiry data set in an inquiry transaction, wherein
the inquiry transaction is stored by the distributed database system,
the inquiry transaction communicates to a predefined number of receivers by the distributed database system,
the predefined number of receivers is ascertained on the basis of the transmitter information and/or the object-specific object data set and/or the providing inquiry data set;
a predefined number of inquiry processing nodes, wherein
the predefined number of inquiry processing nodes is the predefined number of receivers,
in each case the inquiry processing nodes ascertains an object-specific authorization release on the basis of the providing request (e.g. taking account of the object-specific object data set and the transmitter information),
the respective object-specific authorization releases are stored for example in transactions of the distributed database system;
an authorization control module for ascertaining a total authorization release of the resource assigned to the object, wherein
the respective object-specific authorization releases of the respective inquiry processing nodes are taken into account for ascertaining the total authorization release;
the total authorization release is stored for example in transactions of the distributed database system.

In a further implementation variant, the control system comprises the following:
a transmitter for transmitting a providing inquiry data set by a first communication module, wherein
the providing inquiry data set comprises a providing request for a resource assigned to an object,
the providing inquiry data set comprises transmitter information of the transmitter of the providing inquiry data set,
the providing inquiry data set comprises an object-specific object data set for the object; a distributed database system having
a multiplicity of nodes, wherein the nodes are connected to one another via a first communication network;
a second communication module for receiving the providing inquiry data set;
a first storage module for storing the providing inquiry data set in an inquiry transaction, wherein
the inquiry transaction is stored by the distributed database system,
the inquiry transaction communicates to a predefined number of receivers by the distributed database system,
the predefined number of receivers is ascertained on the basis of the transmitter information and/or the object-specific object data set and/or the providing inquiry data set;

a predefined number of inquiry processing nodes, wherein
the predefined number of inquiry processing nodes is the predefined number of receivers,
in each case the inquiry processing nodes ascertains an object-specific authorization release on the basis of the providing request (e.g. taking account of the object-specific object data set and the transmitter information),
the respective object-specific authorization releases are stored for example in transactions of the distributed database system;
an authorization control module for ascertaining a total authorization release of the resource assigned to the object, wherein
the respective object-specific authorization releases of the respective inquiry processing nodes are taken into account for ascertaining the total authorization release;
the total authorization release is stored for example in transactions of the distributed database system.

In a further implementation variant, the control system comprises the following:
a transmitter for transmitting a providing inquiry data set by a first communication module, wherein
the providing inquiry data set comprises a providing request for a resource assigned to an object,
the providing inquiry data set comprises transmitter information of the transmitter of the providing inquiry data set,
the providing inquiry data set comprises an object-specific object data set for the object; a distributed database system having
a multiplicity of nodes, wherein the nodes are connected to one another via a first communication network;
a second communication module for receiving the providing inquiry data set;
a first checking module for checking the transmitter on the basis of the transmitter information, wherein the first checking module provides a corresponding transmitter checking result;
a first storage module for storing the providing inquiry data set with the corresponding transmitter checking result in an inquiry transaction, wherein
the inquiry transaction is stored by the distributed database system,
the inquiry transaction communicates to a predefined number of receivers by the distributed database system,
the predefined number of receivers is ascertained on the basis of the transmitter checking result and/or the transmitter information and/or the object-specific object data set and/or the providing inquiry data set;
a predefined number of inquiry processing nodes, wherein
the predefined number of inquiry processing nodes is the predefined number of receivers,
in each case the inquiry processing nodes ascertain an object-specific authorization release on the basis of the providing request, the object-specific object data set and the transmitter information,
the respective object-specific authorization releases are stored in transactions of the distributed database system;
an authorization control module for ascertaining a total authorization release of the resource assigned to the object, wherein the respective object-specific authorization releases of the respective inquiry processing nodes are taken into account for ascertaining the total authorization release;
the total authorization release is stored in transactions of the distributed database system;
a resource release module, wherein
providing the resource assigned to the object is controlled by the total authorization release.

In a further implementation variant, the control system comprises the following:
a transmitter for transmitting a providing inquiry data set by a first communication module, wherein
the providing inquiry data set comprises a providing request for a resource assigned to an object,
the providing inquiry data set comprises transmitter information of the transmitter of the providing inquiry data set,
the providing inquiry data set comprises an object-specific object data set for the object; a distributed database system having
a multiplicity of nodes, wherein the nodes are connected to one another via a first communication network;
a second communication module for receiving the providing inquiry data set;
a first storage module for storing the providing inquiry data set in an inquiry transaction, wherein
the inquiry transaction is stored by the distributed database system,
the inquiry transaction communicates to a predefined number of receivers by the distributed database system,
the predefined number of receivers is ascertained on the basis of the transmitter information and/or the object-specific object data set and/or the providing inquiry data set;
a predefined number of inquiry processing nodes, wherein
the predefined number of inquiry processing nodes is the predefined number of receivers,
in each case the inquiry processing nodes ascertains an object-specific authorization release on the basis of the providing request (e.g. taking account of the object-specific object data set and the transmitter information),
the respective object-specific authorization releases are stored for example in transactions of the distributed database system;
an authorization control module for ascertaining a total authorization release for the resource assigned to the object, wherein
the respective object-specific authorization releases of the respective inquiry processing nodes are taken into account for ascertaining the total authorization release;
the total authorization release is stored for example in transactions of the distributed database system.

In a further implementation variant, the first storage module is embodied as a separate module and comprises:
a communication module for receiving a providing inquiry data set;
a determining module for ascertaining a predefined number of receivers on the basis of the transmitter information and/or the object-specific object data set and/or the providing inquiry data set;

an (integral) storage module for storing the providing inquiry data set in an inquiry transaction, wherein
the inquiry transaction is stored by a/the distributed database system,
the inquiry transaction communicates to the predefined number of receivers by the distributed database system.

In a further implementation variant, the authorization control module is embodied as a separate module and comprises:
a communication module for receiving respective object-specific authorization releases for a resource assigned to an object;
an (internal) authorization control module for ascertaining a total authorization release for the resource assigned to the object, wherein
the respective object-specific authorization releases of the respective inquiry processing nodes are taken into account for ascertaining the total authorization release;
the total authorization release is stored for example in transactions of the distributed database system.

FIG. 2 shows a second exemplary embodiment of the invention. FIG. 2 shows a variant of the transmitter S from FIG. 1. Depending on the implementation variant chosen, the transmitter S can also be the object from FIG. 1 and/or an inquiry processing node from FIG. 1.

In specific detail, in this exemplary embodiment firstly it is assumed that the transmitter S is the object. The transmitter S comprises a first communication module 150_D (which has already been explained in FIG. 1), a sensor 220, a monitored electronic component 230 and a control module 240, which are communicatively connected to one another via a bus 201.

The transmitter S or the object can be a cellular phone or a smartphone. The sensor 220 can be a sensor 220 for monitoring the electronic component 230. The electronic component can be the smartphone display/monitor, for example. The sensor 220 can detect for example when the backlighting has failed and/or the touchscreen is damaged (e.g. fault signals of the touch surface of the touchscreen are generated as a result of a crack in the display, the sensor 220 evaluating the signals). The sensor 220 can detect a state of the electronic component at a predefined point in time.

During the registration explained in FIG. 1, the control module 240 (e.g. the computer program or the App from FIG. 1) detects a first state of the electronic component by the sensor 220, the first state corresponding to an operationally available or non-defective state of the electronic component. This state (or object state) is stored for example in the object-specific object data set of the registration data set.

If the smartphone falls or is dropped and the display or the touch-sensitive monitor (touch display) is damaged in the process, the sensor 220 detects this state change of the electronic component 230 (that is to say of the display) and provides this state change to the control module 240, e.g. by a control signal. The control module 240 then creates the providing inquiry data set (or a variant thereof) explained in the previous exemplary embodiments and communicates this to the control system or the second communication module from FIG. 1.

In other words, the first communication module 150_S is designed for transmitting the providing inquiry data set (e.g. by a distributed database system), wherein the providing inquiry data set comprises a providing request for a resource assigned to the transmitter 150_S (e.g. a replacement part for the defective electronic component 230). Alternatively or additionally, the providing inquiry data set comprises transmitter information of the transmitter S of the providing inquiry data set. Alternatively or additionally, the providing inquiry data set comprises the object-specific object data set for the transmitter S or for the monitored electronic component 230. The object-specific object data set and/or the transmitter information are/is calculated by the control module and stored in the providing inquiry data set, for example, if the state change (display defect) has occurred, for example. The object-specific object data set can for example also comprise even further sensor data or measurement values detected by sensors which are associated with the occurrence of the state change of the object or of the electronic component. Associated here means for example that all or selected sensor data are detected within a predefined time period (e.g. 5 minutes) before and after the occurrence of the state change. In this case, these sensor data (selected/all) are likewise stored in the object-specific object data set. In the case of a smartphone, for example, the sensor data can be for example measurement values concerning the position or position data of the smartphone. Such data are for example ascertained by the smartphone anyway.

The transmitter S can for example also be embodied as a node of the distributed database system and for example store the providing inquiry data set in a transaction and communicate or transmit it e.g. to the control system and/or the first checking module and/or the first storage module. If the distributed database system is a blockchain, for example, the transmitter S for this purpose can comprise the necessary cryptographic keys in order to sign the corresponding transactions. For this purpose, by way of example, the transmitter S can comprise a corresponding blockchain wallet or the latter can be installed on the transmitter.

The inquiry processing nodes (not illustrated in a figure) can be embodied similarly or analogously to the transmitter S.

An inquiry processing node comprises a communication module (e.g. a communication module such as has already been explained in FIG. 1) and an inquiry processing module, which are communicatively connected to one another via a bus. The inquiry processing node receives the inquiry transaction by the communication module and communicates the inquiry transaction to the inquiry processing module. The inquiry processing module is for example a (configured) neural network designed to ascertain an object-specific authorization release on the basis of the providing request, the object-specific object data set and the transmitter information (as has already been explained for example in FIG. 1). The authorization release ascertained is then stored for example in a data set and/or a corresponding transaction. If the inquiry processing node is a node of the distributed database system, for example, the corresponding transaction is a transaction of the distributed database system. The transaction can then be communicated to the authorization control module by the distributed database system, for example. As already explained in FIG. 1, the inquiry processing node can also be an external node.

In one variant, the inquiry processing node is a transmitter analogous to the transmitter S which additionally comprises an inquiry processing module. In one variant, the transmitter S, too, can comprise an inquiry processing module in order that it can also operate or be realized as an inquiry processing node. However, a transmitter having the functionality of an inquiry processing node does not process an inquiry transaction/providing inquiry data set generated by the transmitter itself.

The transmitter and/or the nodes and/or the object and/or the inquiry processing nodes can each for example additionally also comprise one further or a plurality of further component(s) such as, for example, a processor, a storage unit, further communication interfaces (e.g. Ethernet, WLAN), an input device, a computer keyboard or a computer mouse, and a display device (e.g. a monitor). The processor can comprise a plurality of further processors, for example, which can be used for realizing further exemplary embodiments. The further component(s) can for example likewise be communicatively connected to one another via the respective bus.

The processor can be an ASIC, for example, which was realized in an application-specific manner for the function of a respective module or of all the modules of the exemplary embodiment (and/or of further exemplary embodiments), wherein the program component or the program instructions is/are realized as integrated circuits, in particular. The processor can also be an FPGA, for example, which is configured by the program instructions in such a way that the FPGA realizes the functions of a respective module or of all the modules of the exemplary embodiment (and/or of further exemplary embodiments).

FIG. 3 shows a third exemplary embodiment of the invention, which illustrates the distributed database system from FIG. 1. In specific detail, FIG. 3 shows the communication between the distributed database system BC, the transmitter S (which is embodied as a node of the distributed database system BC) and the selected inquiry processing nodes BCN_S of the control system from FIG. 1.

This variant can for example also be realized by the exemplary embodiment from FIG. 1 or is compatible therewith. Accordingly, the distributed database system from FIG. 3 can likewise have one or more modules of the control system from FIG. 1.

The distributed database system realized as a blockchain BC, a plurality of transactions T are provided or a plurality of transactions T are stored.

By way of example, transaction T2a is an inquiry transaction from the previous exemplary embodiments. In a first step S1, this inquiry transaction is transmitted to the distributed database system and stored as transaction T2a. The storage module from FIG. 1 then communicates the transaction T2a or the inquiry transaction to the predefined number of inquiry processing nodes BCN_S. The number is only 2 inquiry processing nodes here for the sake of clarity. The inquiry processing nodes and the transmitter S are embodied as nodes of the distributed database system in this example. The selected inquiry processing nodes comprise a first inquiry processing node BCN(1) and a second inquiry processing node BCN(2). The first inquiry processing node BCN(1) receives the transaction T2a or the inquiry transaction in step S2 and the second inquiry processing node BCN(2) receives the transaction T2a or the inquiry transaction in step S3.

The first inquiry processing node BCN(1) ascertains a first object-specific authorization release on the basis of the inquiry transaction (more precisely on the basis of the data that the inquiry transaction comprises, e.g. the providing request, the object-specific object data set and the transmitter information) and stores it in the transaction T3a. In a step S4, in an analogous manner, the second inquiry processing node BCN(2) ascertains a second object-specific authorization release and stores it in the transaction T3b, for example.

The authorization control module then ascertains the total authorization release of the resource assigned to the object (e.g. a display for a smartphone if the object is a smartphone). In order to ascertain the total authorization release, the corresponding transactions with the object-specific authorization releases are communicated to the authorization control module or retrieved by the latter. The authorization control module then ascertains the total authorization release on the basis of the respective object-specific authorization releases of the respective inquiry processing nodes. The release of the resource can then be controlled with the total authorization release. By way of example, by this means, a delivery of a replacement part can be controlled or automated or the payment of the value of the display to the transmitter can be controlled.

FIG. 4 shows a fourth exemplary embodiment of the invention as a flow diagram of the method according to embodiments of the invention.

The method is realized in a computer-aided manner.

In specific detail, a method for the computer-aided control of providing resources is realized in this exemplary embodiment.

The method comprises a first method step for transmitting 410 a providing inquiry data set by a first communication module, wherein
    the providing inquiry data set comprises a providing request for a resource assigned to an object,
    the providing inquiry data set comprises transmitter information of the transmitter of the providing inquiry data set,
    the providing inquiry data set comprises an object-specific object data set for the object.

The method comprises a second method step for receiving 420 the providing inquiry data set.

The method comprises a third method step for checking 430 the transmitter on the basis of the transmitter information, wherein the first checking module provides a corresponding transmitter checking result. If the transmitter checking result is positive Y (e.g. the transmitter is authorized to transmit a corresponding providing inquiry data set), for example, the providing inquiry data set is processed further. If the transmitting checking result is negative N (e.g. the transmitter is not authorized to transmit a corresponding providing inquiry data set), e.g. an error message or an error signal is output or provided in a further method step 435.

The method comprises a fourth method step for storing 440 the providing inquiry data set with the corresponding transmitter checking result in an inquiry transaction, wherein
    the inquiry transaction is stored by the distributed database system,
    the inquiry transaction communicates to a predefined number of receivers by the distributed database system,
    the distributed database system has a multiplicity of nodes that are connected to one another via a first communication network,
    the predefined number of receivers is ascertained on the basis of the transmitter checking result and/or the transmitter information and/or the object-specific object data set.

The method comprises a fifth method step for ascertaining 450 an object-specific authorization release on the basis of the providing request, the object-specific object data set and the transmitter information by a predefined number of inquiry processing nodes, wherein
    the predefined number of inquiry processing nodes is the predefined number of receivers,
    the respective object-specific authorization releases are stored in transactions of the distributed database system.

The method comprises a sixth method step for ascertaining 460 a total authorization release of the resource assigned to the object, wherein
the respective object-specific authorization releases of the respective inquiry processing nodes are taken into account for ascertaining the total authorization release;
the total authorization release is stored in transactions of the distributed database system.

If the total authorization release is positive Y (e.g. it is confirmed that the corresponding resource is provided), for example, the method carries on with method step six. If the total authorization release is negative N (e.g. the corresponding resource is prevented from being provided), e.g. an error message or an error signal is output or provided in a further method step 465.

Accordingly, the method comprises the seventh method step for the control 470 of providing the resource assigned to the object by the total authorization release.

FIG. 5 shows a fourth exemplary embodiment of the invention as a flow diagram of the method according to embodiments of the invention.

The method is realized in a computer-aided manner.

In specific detail, a method for the computer-aided transmission of a providing inquiry data set is realized in this exemplary embodiment.

The method comprises a first method step for transmitting 510 a providing inquiry data set by a first communication module, wherein
the providing inquiry data set comprises a providing request for a resource assigned to an object,
the providing inquiry data set comprises transmitter information of the transmitter of the providing inquiry data set,
the providing inquiry data set comprises an object-specific object data set for the object.

FIG. 6 shows a fourth exemplary embodiment of the invention as a flow diagram of the method according to embodiments of the invention.

The method is realized in a computer-aided manner.

In specific detail, a method for the computer-aided control of providing resources is realized in this exemplary embodiment.

The method comprises a first method step for receiving 610 the providing inquiry data set.

The method comprises a second method step for checking 620 the transmitter on the basis of the transmitter information, wherein the first checking module provides a corresponding transmitter checking result. If the transmitting checking result is positive Y (e.g. the transmitter is authorized to transmit a corresponding providing inquiry data set), for example, the providing inquiry data set is processed further. If the transmitting checking result is negative N (e.g. the transmitter is not authorized to transmit a corresponding providing inquiry data set), e.g. an error message or an error signal is output or provided in a further method step 625.

The method comprises a third method step for storing 630 the providing inquiry data set with the corresponding transmitter checking result in an inquiry transaction, wherein
the inquiry transaction is stored by the distributed database system,
the inquiry transaction communicates to a predefined number of receivers by the distributed database system,
the distributed database system has a multiplicity of nodes that are connected to one via a first communication network,
the predefined number of receivers is ascertained on the basis of the transmitter checking result and/or the transmitter information and/or the object-specific object data set.

The method comprises a fourth method step for ascertaining 640 an object-specific authorization release on the basis of the providing request, the object-specific object data set and the transmitter information by a predefined number of inquiry processing nodes, wherein
the predefined number of inquiry processing nodes is the predefined number of receivers,
the respective object-specific authorization releases are stored in transactions of the distributed database system.

The method comprises a fifth method step for ascertaining 650 a total authorization release of the resource assigned to the object, wherein
the respective object-specific authorization releases of the respective inquiry processing nodes are taken into account for ascertaining the total authorization release;
the total authorization release is stored in transactions of the distributed database system.

If the total authorization release is positive Y (e.g. it is confirmed that the corresponding resource is provided), for example, the method carries on with method step seven. If the total authorization release is negative N (e.g. the corresponding resource is prevented from being provided), e.g. an error message or an error signal is output or provided in a further method step 655.

Accordingly, the method comprises the sixth method step for the control 660 of providing the resource assigned to the object by the total authorization release.

Embodiments of the invention make it possible to realize, in a simple manner, resource control for networked devices in which the subscribers (e.g. subscribers which are communicatively connected to one another by the networked devices) of the networked devices do not trust one another in each case. Embodiments of the invention are realized by a distributed database system, which is implemented by a blockchain, for example.

A further exemplary embodiment, not shown in a separate figure, relates to a control system for controlling a resource release module for providing resources comprising:
a transmitter for transmitting a providing inquiry data set by a first communication module, wherein
for example the providing inquiry data set comprises a providing request for a resource assigned to an object,
for example the providing inquiry data set comprises transmitter information of the transmitter of the providing inquiry data set,
for example the providing inquiry data set comprises an object-specific object data set for the object;
for example a distributed database system having
for example a multiplicity of nodes, wherein e.g. the nodes are connected to one another via a first communication network;
a second communication module for receiving the providing inquiry data set;
a first checking module for checking the transmitter on the basis of the transmitter information, wherein the first checking module provides a corresponding transmitter checking result;
a first storage module for storing the providing inquiry data set with the corresponding transmitter checking result in an inquiry transaction, wherein the inquiry transaction is stored by the distributed database system,
the inquiry transaction communicates to a predefined number of receivers by the distributed database system,
the predefined number of receivers is ascertained on the basis of the transmitter checking result and/or the transmitter information and/or the object-specific object data set;
a predefined number of inquiry processing nodes, wherein
the predefined number of inquiry processing nodes is the predefined number of receivers,
the inquiry processing nodes in each case ascertain an object-specific authorization release on the basis of the providing request, the object-specific object data set and the transmitter information,
for example the respective object-specific authorization releases are stored in transactions of the distributed database system;
an authorization control module for ascertaining a total authorization release of the resource assigned to the object, wherein
the respective object-specific authorization releases of the respective inquiry processing nodes are taken into account for ascertaining the total authorization release;
for example the total authorization release is stored in transactions of the distributed database system;
for example a resource release module, wherein
for example providing the resource assigned to the object is controlled by the total authorization release.

A further exemplary embodiment, not shown in a separate figure, relates to a control system for controlling a resource release module for providing resources comprising:
for example a transmitter for transmitting a providing inquiry data set by a first communication module, wherein
for example the providing inquiry data set comprises a providing request for a resource assigned to an object,
for example the providing inquiry data set comprises transmitter information of the transmitter of the providing inquiry data set,
for example the providing inquiry data set comprises an object-specific object data set for the object;
for example a distributed database system having
for example a multiplicity of nodes, wherein e.g. the nodes are connected to one another via a first communication network;
a second communication module for receiving the providing inquiry data set;
a first checking module for checking the transmitter on the basis of the transmitter information, wherein the first checking module provides a corresponding transmitter checking result;
a first storage module for storing the providing inquiry data set with the corresponding transmitter checking result in an inquiry transaction, wherein
the inquiry transaction is stored by the distributed database system,
the inquiry transaction communicates to a predefined number of receivers by the distributed database system,
the predefined number of receivers is ascertained on the basis of the transmitter checking result and/or the transmitter information and/or the object-specific object data set;
a predefined number of inquiry processing nodes, wherein
for example the receivers (e.g. predefined number of receivers) are at least one portion of the inquiry processing nodes or the receivers (e.g. predefined number of receivers) correspond to at least one portion of the inquiry processing nodes,
the inquiry processing nodes in each case ascertain an object-specific authorization release on the basis of the providing request, the object-specific object data set and the transmitter information,
for example the respective object-specific authorization releases are stored in transactions of the distributed database system;
an authorization control module for ascertaining a total authorization release of the resource assigned to the object, wherein
the respective object-specific authorization releases of the respective inquiry processing nodes are taken into account for ascertaining the total authorization release;
for example the total authorization release is stored in transactions of the distributed database system;
for example a resource release module, wherein
for example providing the resource assigned to the object is controlled by the total authorization release.

A further exemplary embodiment, not shown in a separate figure, relates to a transmitter having:
for example a communication module for transmitting a providing inquiry data set, wherein
for example the providing inquiry data set comprises a providing request for a resource assigned to an object,
for example the providing inquiry data set comprises transmitter information of the transmitter of the providing inquiry data set,
for example the providing inquiry data set comprises an object-specific object data set for the object.

A further exemplary embodiment, not shown in a separate figure, relates to a distributed database system having:
for example a multiplicity of nodes, wherein for example the nodes are connected to one another via a first communication network;
for example a second communication module for receiving a providing inquiry data set, wherein
for example the providing inquiry data set comprises a providing request for a resource assigned to an object,
for example the providing inquiry data set comprises transmitter information of the transmitter of the providing inquiry data set,
for example the providing inquiry data set comprises an object-specific object data set for the object;
for example a first checking module for checking the transmitter on the basis of the transmitter information, wherein the first checking module provides a corresponding transmitter checking result;
for example a first storage module for storing the providing inquiry data set with the corresponding transmitter checking result in an inquiry transaction, wherein
for example the inquiry transaction is stored by the distributed database system, for example the inquiry transaction communicates to a predefined number of receivers by the distributed database system, for example the predefined number of receivers is ascertained on the basis of the transmitter checking result and/or the transmitter information and/or the object-specific object data set;

for example a predefined number of inquiry processing nodes, wherein for example the predefined number of inquiry processing nodes is the predefined number of receivers, for example the inquiry processing nodes in each case ascertain an object-specific authorization release on the basis of the providing request, the object-specific object data set and the transmitter information, for example the respective object-specific authorization releases are stored in transactions of the distributed database system;

for example an authorization control module for ascertaining a total authorization release of the resource assigned to the object, wherein for example the respective object-specific authorization releases of the respective inquiry processing nodes are taken into account for ascertaining the total authorization release;

for example the total authorization release is stored in transactions of the distributed database system;

for example a resource release module, wherein for example providing the resource assigned to the object is controlled by the total authorization release.

A further exemplary embodiment, not shown in a separate figure, relates to a distributed database system having:

for example a multiplicity of nodes, wherein for example the nodes are connected to one another via a first communication network;

for example a second communication module for receiving a providing inquiry data set, wherein for example the providing inquiry data set comprises a providing request for a resource assigned to an object, for example a providing inquiry data set comprises transmitter information of the transmitter of the providing inquiry data set, for example the providing inquiry data set comprises an object-specific object data set for the object;

for example a first checking module for checking the transmitter on the basis of the transmitter information, wherein the first checking module provides a corresponding transmitter checking result;

for example a first storage module for storing the providing inquiry data set with the corresponding transmitter checking result in an inquiry transaction, wherein for example the inquiry transaction is stored by the distributed database system, for example the inquiry transaction communicates to a predefined number of receivers by the distributed database system, for example the predefined number of receivers is ascertained on the basis of the transmitter checking result and/or the transmitter information and/or the object-specific object data set;

for example a predefined number of inquiry processing nodes, wherein for example the receivers (e.g. predefined number of receivers) are at least one portion of the inquiry processing nodes or the receivers (e.g. predefined number of receivers) correspond to at least one portion of the inquiry processing nodes, for example the inquiry processing nodes in each case ascertain an object-specific authorization release on the basis of the providing request, the object-specific object data set and the transmitter information, for example the respective object-specific authorization releases are stored in transactions of the distributed database system;

for example an authorization control module for ascertaining a total authorization release of the resource assigned to the object, wherein for example the respective object-specific authorization releases of the respective inquiry processing nodes are taken into account for ascertaining the total authorization release;

for example the total authorization release is stored in transactions of the distributed database system;

for example a resource release module, wherein for example providing the resource assigned to the object is controlled by the total authorization release.

A further exemplary embodiment, not shown in a separate figure, relates to a method for the computer-aided control of providing resources comprising the following method steps:

for example transmitting a providing inquiry data set by a first communication module, wherein for example the providing inquiry data set comprises a providing request for a resource assigned to an object, for example the providing inquiry data set comprises transmitter information of the transmitter of the providing inquiry data set, for example the providing inquiry data set comprises an object-specific object data set for the object;

for example receiving the providing inquiry data set;

for example checking the transmitter on the basis of the transmitter information, wherein the first checking module provides a corresponding transmitter checking result;

for example storing the providing inquiry data set with the corresponding transmitter checking result in an inquiry transaction, wherein for example the inquiry transaction is stored by the distributed database system, for example the inquiry transaction communicates to a predefined number of receivers by the distributed database system, for example the distributed database system has a multiplicity of nodes that are connected to one another via a first communication network, for example the predefined number of receivers is ascertained on the basis of the transmitter checking result and/or the transmitter information and/or the object-specific object data set and/or;

for example ascertaining an object-specific authorization release on the basis of the providing request, the object-specific object data set and the transmitter information by a predefined number of inquiry processing nodes, wherein for example the predefined number of inquiry processing nodes is the predefined number of receivers;

for example ascertaining a total authorization release of the resource assigned to the object, wherein for example the respective object-specific authorization releases of the respective inquiry processing nodes are taken into account for ascertaining the total authorization release;

for example controlling of providing the resource assigned to the object by the total authorization release.

A further exemplary embodiment, not shown in a separate figure, relates to a method for the computer-aided control of providing resources comprising the following method steps:
- for example transmitting a providing inquiry data set by a first communication module, wherein
  - for example the providing inquiry data set comprises a providing request for a resource assigned to an object,
  - for example the providing inquiry data set comprises transmitter information of the transmitter of the providing inquiry data set,
  - for example the providing inquiry data set comprises an object-specific object data set for the object;
- for example receiving the providing inquiry data set;
- for example checking the transmitter on the basis of the transmitter information, wherein the first checking module provides a corresponding transmitter checking result;
- for example storing the providing inquiry data set with the corresponding transmitter checking result in an inquiry transaction, wherein
  - for example the inquiry transaction is stored by the distributed database system,
  - for example the inquiry transaction communicates to a predefined number of receivers by the distributed database system,
  - for example the distributed database system has a multiplicity of nodes that are connected to one another via a first communication network,
  - for example the predefined number of receivers is ascertained on the basis of the transmitter checking result and/or the transmitter information and/or the object-specific object data set and/or;
- for example ascertaining an object-specific authorization release on the basis of the providing request, the object-specific object data set and the transmitter information by a predefined number of inquiry processing nodes, wherein
  - for example the receivers (e.g. predefined number of receivers) are at least one portion of the inquiry processing nodes or the receivers (e.g. predefined number of receivers) correspond to at least one portion of the inquiry processing nodes,
- for example ascertaining a total authorization release of the resource assigned to the object, wherein
  - for example the respective object-specific authorization releases of the respective inquiry processing nodes are taken into account for ascertaining the total authorization release;
- for example controlling of providing the resource assigned to the object by the total authorization release.

A further exemplary embodiment, not shown in a separate figure, relates to a method for the computer-aided transmission of a providing inquiry data set comprising the following method steps:
- for example transmitting a providing inquiry data set by a first communication module, wherein
  - for example the providing inquiry data set comprises a providing request for a resource assigned to an object,
  - for example the providing inquiry data set comprises transmitter information of the transmitter of the providing inquiry data set,
  - for example the providing inquiry data set comprises an object-specific object data set for the object.

A further exemplary embodiment, not shown in a separate figure, relates to a method for the computer-aided control of providing resources comprising the following method steps:
- for example receiving the providing inquiry data set, wherein,
  - for example the providing inquiry data set comprises a providing request for a resource assigned to an object,
  - for example the providing inquiry data set comprises transmitter information of the transmitter of the providing inquiry data set,
  - for example the providing inquiry data set comprises an object-specific object data set for the object;
- for example checking the transmitter on the basis of the transmitter information, wherein the first checking module provides a corresponding transmitter checking result;
- for example storing the providing inquiry data set with the corresponding transmitter checking result in an inquiry transaction, wherein
  - for example the inquiry transaction is stored by the distributed database system,
  - for example the inquiry transaction communicates to a predefined number of receivers by the distributed database system,
  - for example the distributed database system has a multiplicity of nodes that are connected to one another via a first communication network,
  - for example the predefined number of receivers is ascertained on the basis of the transmitter checking result and/or the transmitter information and/or the object-specific object data set and/or;
- for example ascertaining an object-specific authorization release on the basis of the providing request, the object-specific object data set and the transmitter information by a predefined number of inquiry processing nodes, wherein
  - for example the predefined number of inquiry processing nodes is the predefined number of receivers,
- for example ascertaining a total authorization release of the resource assigned to the object, wherein
  - for example the respective object-specific authorization releases of the respective inquiry processing nodes are taken into account for ascertaining the total authorization release;
- for example controlling of providing the resource assigned to the object by the total authorization release.

A further exemplary embodiment, not shown in a separate figure, relates to a method for the computer-aided control of providing resources comprising the following method steps:
- for example receiving the providing inquiry data set, wherein,
  - for example the providing inquiry data set comprises a providing request for a resource assigned to an object,
  - for example the providing inquiry data set comprises transmitter information of the transmitter of the providing inquiry data set,
  - for example the providing inquiry data set comprises an object-specific object data set for the object;
- for example checking the transmitter on the basis of the transmitter information, wherein the first checking module provides a corresponding transmitter checking result;

for example storing the providing inquiry data set with the corresponding transmitter checking result in an inquiry transaction, wherein
for example the inquiry transaction is stored by the distributed database system,
for example the inquiry transaction communicates to a predefined number of receivers by the distributed database system,
for example the distributed database system has a multiplicity of nodes that are connected to one another via a first communication network,
for example the predefined number of receivers is ascertained on the basis of the transmitter checking result and/or the transmitter information and/or the object-specific object data set and/or;
for example ascertaining an object-specific authorization release on the basis of the providing request, the object-specific object data set and the transmitter information by a predefined number of inquiry processing nodes, wherein
for example the receivers (e.g. predefined number of receivers) are at least one portion of the inquiry processing nodes or the receivers (e.g. predefined number of receivers) correspond to at least one portion of the inquiry processing nodes,
for example ascertaining a total authorization release of the resource assigned to the object, wherein
for example the respective object-specific authorization releases of the respective inquiry processing nodes are taken into account for ascertaining the total authorization release;
for example controlling of providing the resource assigned to the object by the total authorization release.

The control systems and/or transmitters and/or distributed database systems explained in the patent application can additionally each comprise for example a configuration interface and/or a fan and/or a monitoring module. By way of example, updates or firmware versions can be imported by the configuration interface. For example, the control system and/or the transmitter and/or the distributed database system can be cooled by the fan. The monitoring module, the state and/or the operating behavior of the control system and/or of the transmitter and/or of the distributed database system can be monitored and be stored e.g. in a file (e.g. a logging file).

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A control system for controlling a resource release module for providing resources comprising:
at least one processor device;
a transmitter for transmitting a providing inquiry data set by a first communication module, wherein
the providing inquiry data set comprises a providing request for a resource assigned to an object,
the providing inquiry data set comprises transmitter information of the transmitter of the providing inquiry data set,
the providing inquiry data set comprises an object-specific object data set for the object,
wherein transmitting is controlled by a state change of the object that is detected by a sensor, wherein the state change of the object occurs in an event of a defect of an electronic component of the object, damage to the electronic component of the object, and/or a malfunction of the electronic component of the object, and wherein the transmission of the providing inquiry data set is automated by the occurrence of the event;
a distributed database system having
a second communication module for receiving the providing inquiry data set;
a first checking module for checking the transmitter on the basis of the transmitter information, wherein the first checking module provides a corresponding transmitter checking result;
a first storage module for storing the providing inquiry data set with the corresponding transmitter checking result in an inquiry transaction, wherein
the inquiry transaction is stored by the distributed database system,
the inquiry transaction communicates to a predefined number of receivers by the distributed database system,
the predefined number of receivers is ascertained on the basis of the transmitter checking result and/or the transmitter information and/or the object-specific object data set and/or the providing inquiry data set;
a predefined number of inquiry processing nodes, wherein
the receivers are at least one portion of the inquiry processing nodes,
the inquiry processing nodes in each case ascertain an object-specific authorization release on the basis of the providing request, the object-specific object data set and the transmitter information,
an authorization control module for ascertaining a total authorization release of the resource assigned to the object, wherein
the respective object-specific authorization releases of the respective inquiry processing nodes are taken into account for ascertaining the total authorization release; and
a resource release module, wherein
providing the resource assigned to the object is controlled by the total authorization release;
wherein the transmitter, the first communication module, the distributed database system, the second communication module, the first checking module, the first storage module, the authorization control module, and/or the resource release module comprise a hardware processor; and
wherein the resource assigned to the object includes a replacement part related to the electronic component of the object.

2. The control system as claimed in claim 1, wherein the transmitter information comprises at least one of a digital signature, a unique identifier, a transmitter address, and/or a cryptographic key.

3. The control system as claimed in claim 1, wherein the transmitter is the device, the object, a computer program, an application or a neural network.

4. The control system as claimed in claim 1, wherein the resource is energy, water, a raw material, a product, and/or a payment means.

5. The control system as claimed in claim 1, wherein
the object comprises the sensor and/or
the transmitter comprises the sensor.

6. The control system as claimed in claim 1, wherein
the object-specific object data set comprises a unique identifier of the object, a state change of the object, a date of manufacture of the object, a value of the object, procurement costs of the object, an object state of the object at a predefined point in time, an object type and/or a manufacturer of the object,
the object-specific object data set comprises for example an address of a data source for further information about the object.

7. The control system as claimed in claim 1, wherein
the object is a mobile device, a field device, a product, a gas turbine, a turbine, a wind turbine or a device.

8. The control system as claimed in claim 1, wherein
the providing request comprises a quantity or number of the resource to be provided, and/or
the providing request comprises a destination or an address to which the resource is intended to be provided.

9. The control system as claimed in claim 1, wherein an authorization of the transmitter is checked during the checking of the transmitter.

10. The control system as claimed in claim 1, wherein a quantity or a number of the resource to be provided is ascertained on the basis of the object-specific object data set.

11. The control system as claimed in claim 1, wherein
the control system comprises a registration module for registering the object by a registration data set,
the registration data set comprises a unique identifier of the object, a date of manufacture of the object, a value of the object, procurement costs of the object, an object state of the object at a predefined point in time and an object type, a manufacturer of the object and/or an approved transmitter for the providing inquiry data set.

12. The control system as claimed in claim 1, wherein
the distributed database system is a blockchain, or
the distributed database system is a peer-to-peer database system.

13. The control system as claimed in claim 1, wherein data blocks of the distributed database system are linked to one another via a cryptographic hash function.

14. A transmitter of a communication module for requesting resources having:
at least one processor device;
a first communication module for transmitting a providing inquiry data set, wherein
the providing inquiry data set comprises a providing request for a resource assigned to an object,
the providing inquiry data set comprises transmitter information of the transmitter of the providing inquiry data set,
the providing inquiry data set comprises an object-specific object data set for the object,
wherein transmitting is controlled by a state change of the object that is detected by a sensor, wherein the state change of the object occurs in an event of a defect of an electronic component of the object, damage to the electronic component of the object, and/or a malfunction of the electronic component of the object, and wherein the transmission of the providing inquiry data set is automated by the occurrence of the event;
wherein at least one of the transmitter and the first communication module comprise a hardware processor;
wherein the resource assigned to the object includes a replacement part related to the electronic component of the object; and
wherein the inquiry data set is provided to at least one inquiry processing node of a predefined number of inquiry processing nodes to ascertain an object-specific authorization release based on the providing request, the object specific object data set, and the transmitter information, the object-specific authorization release is taken into account to ascertain a total authorization release, and the resource assigned to the object is released based on the total authorization release.

15. A distributed database system for managing a resource release module for providing resources having
at least one processor device;
a second communication module for receiving a providing inquiry data set, wherein
the providing inquiry data set comprises a providing request for a resource assigned to an object,
the providing inquiry data set comprises transmitter information of the transmitter of the providing inquiry data set,
the providing inquiry data set comprises an object-specific object data set for the object,
wherein transmitting is controlled by a state change of the object that is detected by a sensor, wherein the state change of the object occurs in an event of a defect of an electronic component of the object, damage to the electronic component of the object, and/or a malfunction of the electronic component of the object, and wherein the transmission of the providing inquiry data set is automated by the occurrence of the event;
a first checking module for checking the transmitter on the basis of the transmitter information, wherein the first checking module provides a corresponding transmitter checking result;
a first storage module for storing the providing inquiry data set with the corresponding transmitter checking result in an inquiry transaction, wherein
the inquiry transaction is stored by the distributed database system,
the inquiry transaction communicates to a predefined number of receivers by the distributed database system,
the predefined number of receivers is ascertained on the basis of the transmitter checking result and/or the transmitter information and/or the object-specific object data set;
a predefined number of inquiry processing nodes, wherein
the receivers are at least one portion of the inquiry processing nodes,
the inquiry processing nodes in each case ascertain an object-specific authorization release on the basis of the providing request, the object-specific object data set and the transmitter information,
the respective object-specific authorization releases are stored in transactions of the distributed database system;
an authorization control module for ascertaining a total authorization release of the resource assigned to the object, wherein
the respective object-specific authorization releases of the respective inquiry processing nodes are taken into account for ascertaining the total authorization release;
the total authorization release is stored in transactions of the distributed database system;
a resource release module, wherein
providing the resource assigned to the object is controlled by the total authorization release;

wherein the distributed database system, the second communication module, the first checking module, the first storage module, the authorization control module, and/or the resource release module comprise a hardware processor; and wherein the resource assigned to the object includes a part addressing the defect of the electronic component of the object, the damage to the electronic component of the object, and/or the malfunction of the electronic component of the object.

16. A method for a computer-aided control of providing resources comprising the following method steps:

transmitting a providing inquiry data set by a first communication module, wherein
the providing inquiry data set comprises a providing request for a resource assigned to an object,
the providing inquiry data set comprises transmitter information of the transmitter of the providing inquiry data set,
the providing inquiry data set comprises an object-specific object data set for the object,
wherein transmitting is controlled by a state change of the object that is detected by a sensor, wherein the state change of the object occurs in an event of a defect of an electronic component of the object, damage to the electronic component of the object, and/or a malfunction of the electronic component of the object, and
wherein the transmission of the providing inquiry data set is automated by the occurrence of the event;
receiving the providing inquiry data set;
checking the transmitter on the basis of the transmitter information, wherein the first checking module provides a corresponding transmitter checking result;
storing the providing inquiry data set with the corresponding transmitter checking result in an inquiry transaction, wherein
the inquiry transaction is stored by the distributed database system,
the inquiry transaction communicates to a predefined number of receivers by the distributed database system,
the predefined number of receivers is ascertained on the basis of the transmitter checking result, the transmitter information, and/or the object-specific object data set;
ascertaining an object-specific authorization release on the basis of the providing request, the object-specific object data set and the transmitter information by a predefined number of inquiry processing nodes, wherein
the receivers are at least one portion of the inquiry processing nodes,
ascertaining a total authorization release of the resource assigned to the object, wherein
the respective object-specific authorization releases of the respective inquiry processing nodes are taken into account for ascertaining the total authorization release;
controlling of providing the resource assigned to the object by the total authorization release;
wherein the resource assigned to the object includes a replacement part related to the electronic component of the object.

17. A computer program product, comprising a computer readable hardware storage device having computer readable program code stored therein, said program code executable by a processor of a computer system to implement the method as claimed in claim 16.

18. A providing apparatus for the computer program product as claimed in claim 17, wherein the providing apparatus stores and/or provides the computer program product.

19. A method for a computer-aided transmission of a providing inquiry data set comprising the following method steps:

transmitting a providing inquiry data set by a first communication module, wherein
the providing inquiry data set comprises a providing request for a resource assigned to an object,
the providing inquiry data set comprises transmitter information of the transmitter of the providing inquiry data set,
the providing inquiry data set comprises an object-specific object data set for the object,
wherein transmitting is controlled by a state change of the object that is detected by a sensor, wherein the state change of the object occurs in an event of a defect of an electronic component of the object, damage to the electronic component of the object, and/or a malfunction of the electronic component of the object, and
wherein the transmission of the providing inquiry data set is automated by the occurrence of the event,
wherein the resource assigned to the object includes a replacement part related to the electronic component of the object, and
wherein the inquiry data set is provided to at least one inquiry processing node of a predefined number of inquiry processing nodes to ascertain an object-specific authorization release based on the providing request, the object specific object data set, and the transmitter information, the object-specific authorization release is taken into account to ascertain a total authorization release, and the resource assigned to the object is released based on the total authorization release.

20. A method for a computer-aided control of providing resources comprising the following method steps:

receiving a providing inquiry data set, wherein,
the providing inquiry data set comprises a providing request for a resource assigned to an object,
the providing inquiry data set comprises transmitter information of the transmitter of the providing inquiry data set,
the providing inquiry data set comprises an object-specific object data set for the object,
wherein transmitting is controlled by a state change of the object that is detected by a sensor, wherein the state change of the object occurs in an event of a defect of an electronic component of the object, damage to the electronic component of the object, and/or a malfunction of the electronic component of the object, and
wherein the transmission of the providing inquiry data set is automated by the occurrence of the event;
checking the transmitter on the basis of the transmitter information, wherein the first checking module provides a corresponding transmitter checking result;
storing the providing inquiry data set with the corresponding transmitter checking result in an inquiry transaction, wherein
the inquiry transaction is stored by the distributed database system,
the inquiry transaction communicates to a predefined number of receivers by the distributed database system, the predefined number of receivers is ascertained on the basis of the transmitter checking result, the transmitter information, and/or the object-specific object data set;

ascertaining an object-specific authorization release on the basis of the providing request, the object-specific object data set and the transmitter information by a predefined number of inquiry processing nodes, wherein the receivers are at least one portion of the inquiry processing nodes, ascertaining a total authorization release of the resource assigned to the object, wherein the respective object-specific authorization releases of the respective inquiry processing nodes are taken into account for ascertaining the total authorization release;

controlling of providing the resource assigned to the object by the total authorization release, wherein the resource assigned to the object includes a part addressing the defect of the electronic component of the object, the damage to the electronic component of the object, and/or the malfunction of the electronic component of the object.

* * * * *